(12) United States Patent
Ohashi et al.

(10) Patent No.: US 12,738,036 B2
(45) Date of Patent: Sep. 15, 2026

(54) IMAGE PROCESSING APPARATUS, IMAGE PROCESSING METHOD, AND IMAGE PROCESSING PROGRAM

(71) Applicant: FUJIFILM CORPORATION, Tokyo (JP)

(72) Inventors: Yosuke Ohashi, Tokyo (JP); Kota Kawaguchi, Tokyo (JP)

(73) Assignee: FUJIFILM CORPORATION, Tokyo (JP)

( * ) Notice: Subject to any disclaimer, the term of this patent is extended or adjusted under 35 U.S.C. 154(b) by 237 days.

(21) Appl. No.: 18/626,345

(22) Filed: Apr. 4, 2024

(65) Prior Publication Data

US 2024/0273880 A1 Aug. 15, 2024

Related U.S. Application Data

(63) Continuation of application No. PCT/JP2022/035985, filed on Sep. 27, 2022.

(30) Foreign Application Priority Data

Oct. 6, 2021 (JP) ................................ 2021-165040

(51) Int. Cl.
*G06V 10/776* (2022.01)
*G06V 10/40* (2022.01)
(Continued)

(52) U.S. Cl.
CPC ............ *G06V 10/776* (2022.01); *G06V 10/40* (2022.01); *G06V 10/75* (2022.01); *G06V 10/764* (2022.01);
(Continued)

(58) Field of Classification Search
CPC ...... G06V 10/776; G06V 10/40; G06V 10/75; G06V 10/764; G06V 10/945; G06V 2201/03; A61B 6/00
See application file for complete search history.

(56) References Cited

U.S. PATENT DOCUMENTS

2009/0086891 A1* 4/2009 Ofuji .................... G06T 7/0012 378/37
2009/0240150 A1 9/2009 Wang et al.
(Continued)

FOREIGN PATENT DOCUMENTS

CN 109064455 A 12/2018
JP 2019-58606 A 4/2019

OTHER PUBLICATIONS

International Search Report issued in International Application No. PCT/JP2022/035985 on Nov. 22, 2022.
(Continued)

*Primary Examiner* — Jianxun Yang
(74) *Attorney, Agent, or Firm* — SOLARIS Intellectual Property Group, PLLC

(57) ABSTRACT

An image processing apparatus includes at least one processor, in which the processor acquires a plurality of breast images, displays, according to any one mammary gland volume type among a plurality of mammary gland volume types assigned to each of the plurality of acquired breast images based on a mammary gland volume of a breast, a plurality of selection candidate images corresponding to each of the plurality of breast images for each mammary gland volume type, and extracts a breast image selected for each mammary gland volume type from the plurality of breast images based on the plurality of selection candidate images displayed for each of the mammary gland volume types.

13 Claims, 17 Drawing Sheets

(51) Int. Cl.
*G06V 10/75* (2022.01)
*G06V 10/764* (2022.01)
*G06V 10/94* (2022.01)

(52) U.S. Cl.
CPC ........ *G06V 10/945* (2022.01); *G06V 2201/03* (2022.01)

(56) References Cited

U.S. PATENT DOCUMENTS

| | | | | |
|---|---|---|---|---|
| 2011/0026791 | A1 | 2/2011 | Collins et al. | |
| 2011/0125526 | A1* | 5/2011 | Gustafson | G06F 3/0482 345/620 |
| 2019/0090833 | A1 | 3/2019 | Koike | |

OTHER PUBLICATIONS

Written Opinion of the ISA issued in International Application No. PCT/JP2022/035985 on Nov. 22, 2022.

* cited by examiner

JANUARY 1, 2021 TO JUNE 30, 2021
54
64
62
52
60
51
53
58
70B
70
70A
E
H
S
F

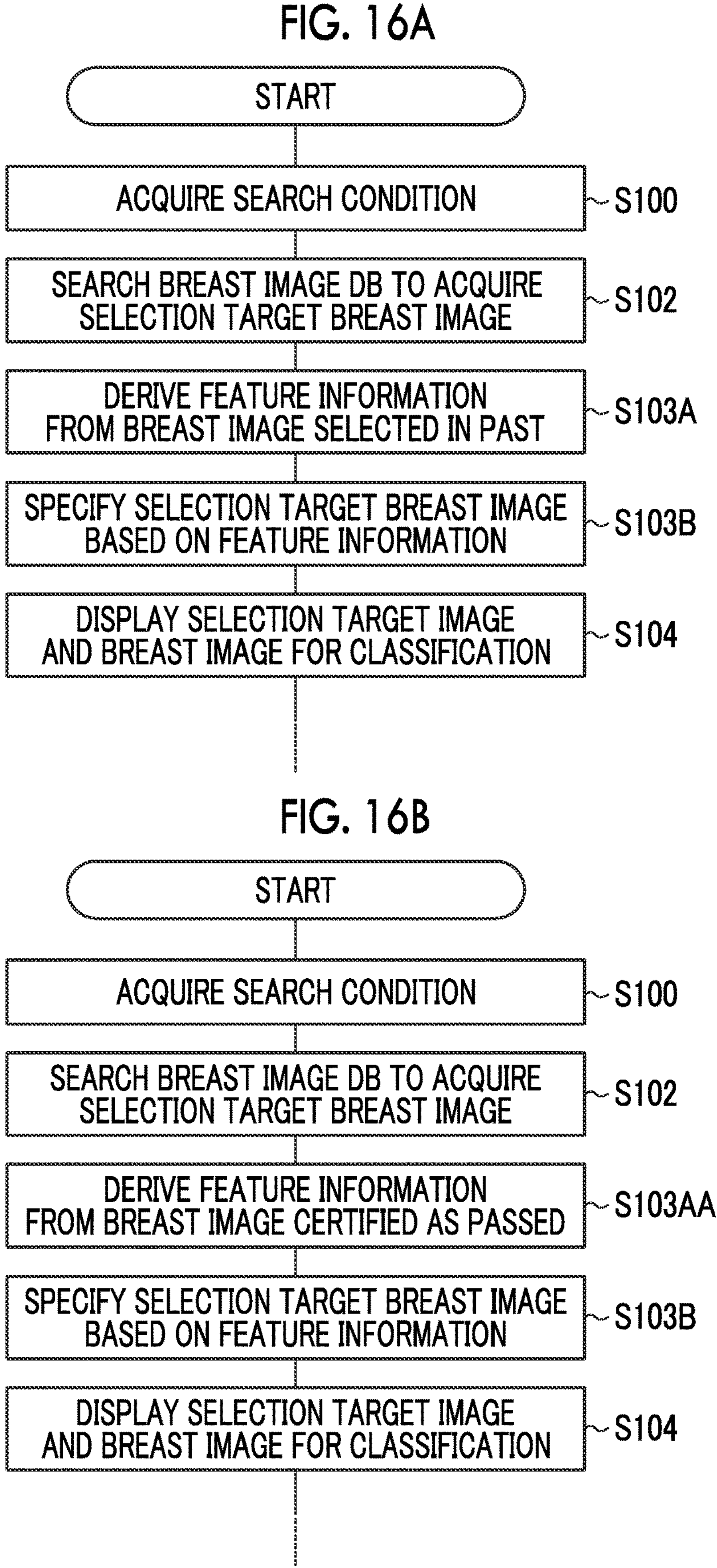
FIG. 16A
START
ACQUIRE SEARCH CONDITION
S100
SEARCH BREAST IMAGE DB TO ACQUIRE SELECTION TARGET BREAST IMAGE
S102
DERIVE FEATURE INFORMATION FROM BREAST IMAGE SELECTED IN PAST
S103A
SPECIFY SELECTION TARGET BREAST IMAGE BASED ON FEATURE INFORMATION
S103B
DISPLAY SELECTION TARGET IMAGE AND BREAST IMAGE FOR CLASSIFICATION
S104
FIG. 16B
START
ACQUIRE SEARCH CONDITION
S100
SEARCH BREAST IMAGE DB TO ACQUIRE SELECTION TARGET BREAST IMAGE
S102
DERIVE FEATURE INFORMATION FROM BREAST IMAGE CERTIFIED AS PASSED
S103AA
SPECIFY SELECTION TARGET BREAST IMAGE BASED ON FEATURE INFORMATION
S103B
DISPLAY SELECTION TARGET IMAGE AND BREAST IMAGE FOR CLASSIFICATION
S104

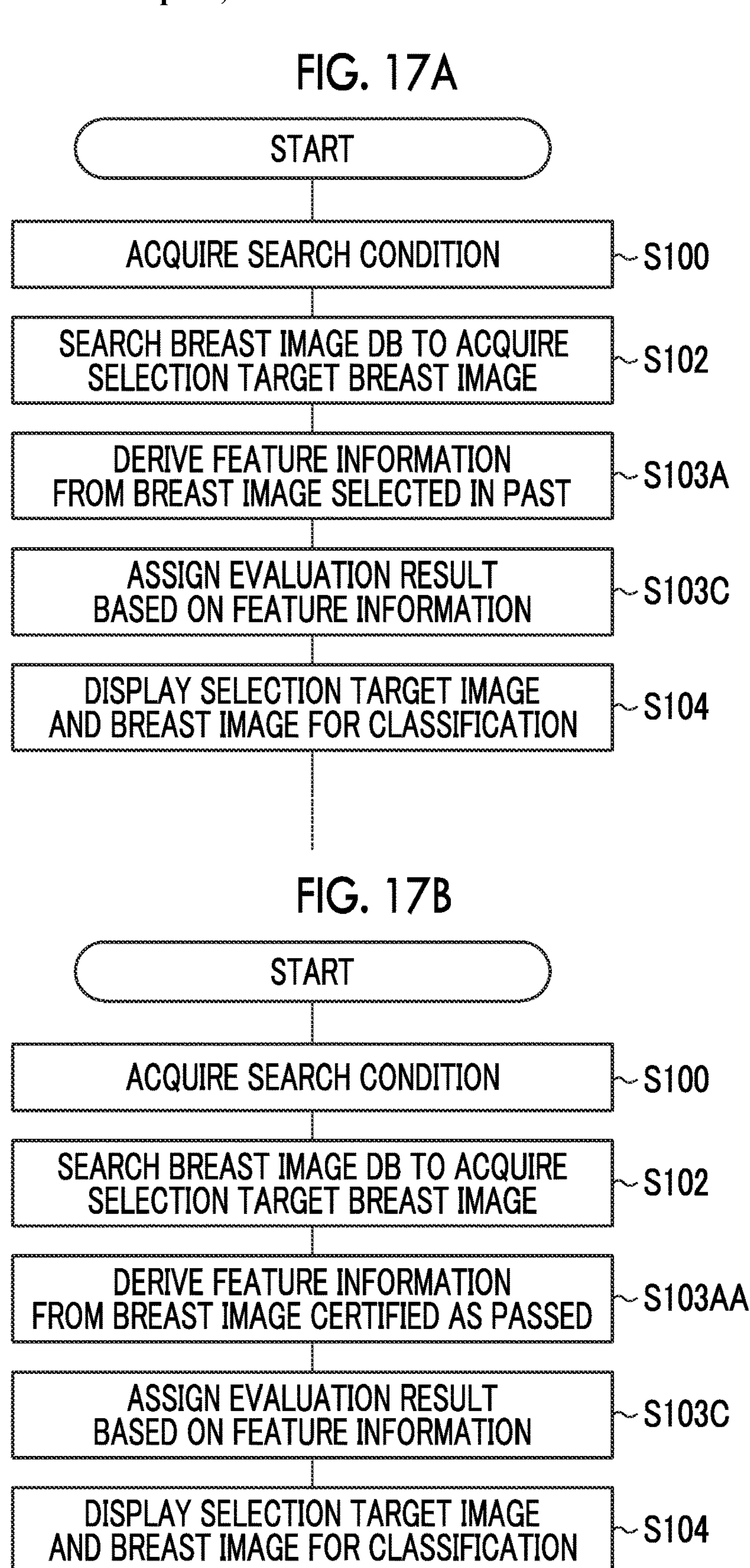
FIG. 17A
START
ACQUIRE SEARCH CONDITION
S100
SEARCH BREAST IMAGE DB TO ACQUIRE SELECTION TARGET BREAST IMAGE
S102
DERIVE FEATURE INFORMATION FROM BREAST IMAGE SELECTED IN PAST
S103A
ASSIGN EVALUATION RESULT BASED ON FEATURE INFORMATION
S103C
DISPLAY SELECTION TARGET IMAGE AND BREAST IMAGE FOR CLASSIFICATION
S104
FIG. 17B
START
ACQUIRE SEARCH CONDITION
S100
SEARCH BREAST IMAGE DB TO ACQUIRE SELECTION TARGET BREAST IMAGE
S102
DERIVE FEATURE INFORMATION FROM BREAST IMAGE CERTIFIED AS PASSED
S103AA
ASSIGN EVALUATION RESULT BASED ON FEATURE INFORMATION
S103C
DISPLAY SELECTION TARGET IMAGE AND BREAST IMAGE FOR CLASSIFICATION
S104

JANUARY 1, 2021 TO JUNE 30, 2021
54
72
52
62
58
53
70B
70
70A
64
51
D
MLO
L
R
F
CC

IMAGE PROCESSING APPARATUS, IMAGE PROCESSING METHOD, AND IMAGE PROCESSING PROGRAM

CROSS-REFERENCE TO RELATED APPLICATIONS

This application is a continuation of International Application No. PCT/JP2022/035985, filed on Sep. 27, 2022, which claims priority from Japanese Application No. 2021-165040, filed on Oct. 6, 2021. The entire disclosure of each of the above applications is incorporated herein by reference.

BACKGROUND

Technical Field

The present disclosure relates to an image processing apparatus, an image processing method, and an image processing program.

Related Art

A technique is known in which a breast, which is an object, is irradiated with radiation by a mammography apparatus, to capture a breast image. As a technique of displaying the captured breast image, there is a technique of performing display according to a type of the breast in the breast image. For example, JP 2019-58606 A describes a technique of identifying a type of a breast from a breast image based on a mammary gland volume and displaying information indicating the identified type of the breast together with the breast image.

In a case in which there are a plurality of breast images to be selected, it may be difficult for a user to select a desired breast image from the plurality of breast images. In the technique described in JP 2019-58606 A, the type of the breast is displayed together with the breast image, but it is necessary to search for a breast image having the same type of the breast from the plurality of breast images.

SUMMARY

The present disclosure provides an image processing apparatus, an image processing method, and an image processing program that can easily select a breast image from a plurality of breast images according to a mammary gland volume type.

A first aspect of the present disclosure relates to an image processing apparatus comprising: at least one processor, in which the processor acquires a plurality of breast images, displays, according to any one mammary gland volume type among a plurality of mammary gland volume types assigned to each of the plurality of acquired breast images based on a mammary gland volume of a breast, a plurality of selection candidate images corresponding to each of the plurality of breast images for each mammary gland volume type, and extracts a breast image selected for each mammary gland volume type from the plurality of breast images based on the plurality of selection candidate images displayed for each of the mammary gland volume types.

A second aspect of the present disclosure relates to an image processing method executed by a computer, the method comprising: acquiring a plurality of breast images; displaying, according to any one mammary gland volume type among a plurality of mammary gland volume types assigned to each of the plurality of acquired breast images based on a mammary gland volume of a breast, a plurality of selection candidate images corresponding to each of the plurality of breast images for each mammary gland volume type; and extracting a breast image selected for each mammary gland volume type from the plurality of breast images based on the plurality of selection candidate images displayed for each of the mammary gland volume types.

A third aspect of the present disclosure relates to an image processing program causing a computer to execute a process comprising: acquiring a plurality of breast images; displaying, according to any one mammary gland volume type among a plurality of mammary gland volume types assigned to each of the plurality of acquired breast images based on a mammary gland volume of a breast, a plurality of selection candidate images corresponding to each of the plurality of breast images for each mammary gland volume type; and extracting a breast image selected for each mammary gland volume type from the plurality of breast images based on the plurality of selection candidate images displayed for each of the mammary gland volume types.

According to the above aspects, the image processing apparatus, the image processing method, and the image processing program of the present disclosure can easily select the breast image from the plurality of breast images according to the mammary gland volume type.

BRIEF DESCRIPTION OF THE DRAWINGS

FIG. 16A is a flowchart showing an example of a flow of image processing of the image processing apparatus according to Modification Example 2.

FIG. 16B is a flowchart showing another example of the flow of the image processing of the image processing apparatus according to Modification Example 2.

FIG. 17A is a flowchart showing an example of a flow of image processing of the image processing apparatus according to Modification Example 3.

FIG. 17B is a flowchart showing another example of the flow of the image processing of the image processing apparatus according to Modification Example 3.

DESCRIPTION

Hereinafter, an exemplary embodiment of the present disclosure will be described in detail with reference to the drawings. The present exemplary embodiment does not limit the present disclosure.

Figure 1:
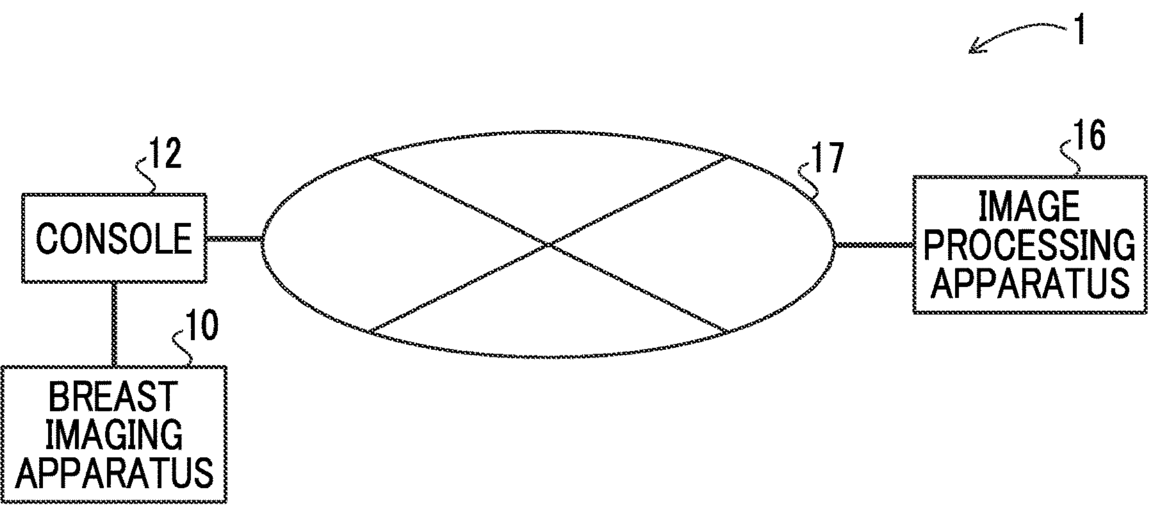
FIG. 1 is a configuration diagram schematically showing an example of an overall configuration of a imaging system according to an exemplary embodiment.

First, an example of an overall configuration of a imaging system according to the present exemplary embodiment will be described. FIG. 1 is a configuration diagram showing an example of an overall configuration of a imaging system 1 according to the present exemplary embodiment. As shown in FIG. 1, the imaging system 1 according to the present exemplary embodiment comprises a breast imaging apparatus 10, a console 12, and an image processing apparatus 16. The console 12 and the image processing apparatus 16 are connected by wired communication or wireless communication via a network 17.

The breast imaging apparatus 10 according to the present exemplary embodiment is an apparatus that captures a breast image with a breast of an object as an examinee under control of the console 12. The breast imaging apparatus 10 according to the present exemplary embodiment is, for example, a mammography apparatus that irradiates the breast with radiation R (for example, X-rays) to capture a radiation image of the breast. In the present exemplary embodiment, an image showing the breast captured by the breast imaging apparatus 10 is referred to as a "breast image". The breast image according to the present exemplary embodiment is, for example, the radiation image captured by the mammography apparatus. The breast image captured by the breast imaging apparatus 10 is output to the console 12 using wireless communication or wired communication via a communication interface (I/F) unit (not shown).

The console 12 has a function of controlling the capture of the breast image via the breast imaging apparatus 10 by using an imaging order or an instruction given by a user, such as a technician. As an example, the console 12 according to the present exemplary embodiment is a server computer comprising a control unit, a storage unit, a communication I/F unit, an operation unit, a display unit, and the like, which are not shown. The console 12 outputs the breast image captured by the breast imaging apparatus 10 to the image processing apparatus 16 via the network 17 in association with identification information or accessory information (details will be described later).

The image processing apparatus 16 has a function of allowing the user to select the breast image for each mammary gland volume type of the breast from a plurality of breast images acquired from the console 12. For example, in the present exemplary embodiment, a case will be described in which the user selects the breast image to be used for a report for obtaining the certification by the third-party institution regarding the capture of the breast image via the breast imaging apparatus 10 for each mammary gland volume type from the plurality of breast images obtained by the breast imaging apparatus 10.

Figure 2:
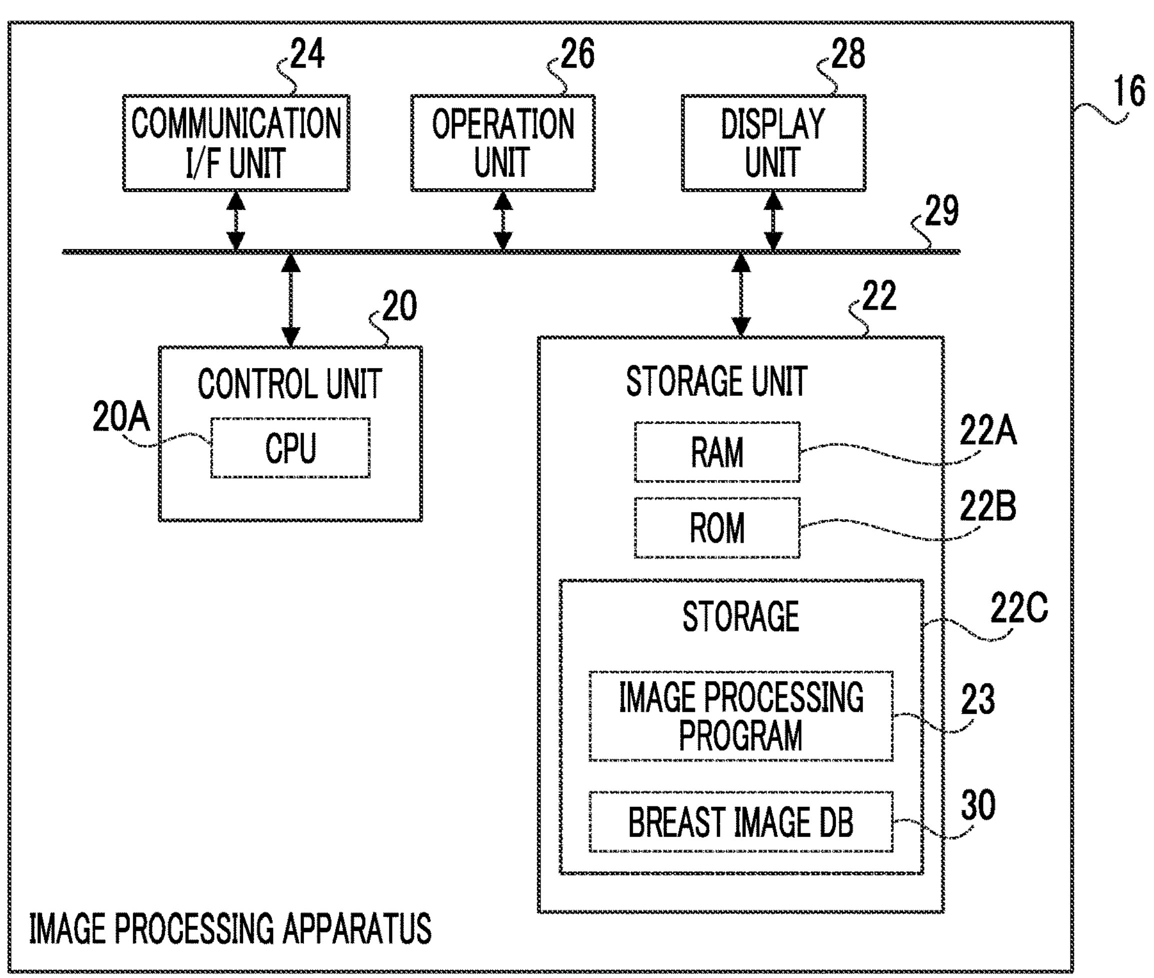
FIG. 2 is a block diagram showing an example of a configuration of an image processing apparatus according to the exemplary embodiment.

As shown in FIG. 2, the image processing apparatus 16 comprises a control unit 20, a storage unit 22, a communication I/F unit 24, an operation unit 26, and a display unit 28. The control unit 20, the storage unit 22, the communication I/F unit 24, the operation unit 26, and the display unit 28 are connected to each other via a bus 29 such as a system bus or a control bus so that various types of information can be exchanged.

The control unit 20 according to the present exemplary embodiment controls the operation of the entire image processing apparatus 16. The control unit 20 is a processor, and comprises a central processing unit (CPU) 20A. The control unit 20 is connected to the storage unit 22 which will be described below. The control unit 20 may comprise a graphics processing unit (GPU).

The operation unit 26 is used for the user to input an instruction regarding the selection of the breast image, various types of information, and the like. The operation unit 26 is not particularly limited, and examples thereof include various switches, a touch panel, a touch pen, and a mouse. The display unit 28 displays the breast image, various types of information, and the like. The operation unit 26 and the display unit 28 may be integrated into a touch panel display.

The communication OF unit 24 performs communication of various types of information with the console 12 via the network 17 using wireless communication or wired communication. The image processing apparatus 16 receives image data of the breast image captured by the breast imaging apparatus 10 from the console 12 using wireless communication or wired communication via the communication OF unit 24. In the breast image according to the present exemplary embodiment, there are a plurality of types such as a normal-sized breast image and a thumbnail image having a smaller size than the normal size. Therefore, in a case in which the types are not distinguished, the breast images are simply referred to as a "breast image", and the breast images having a general size used for normal interpretation or the like are referred to as a "breast image". The breast image received by the image processing apparatus 16 from the console 12 is a "normal breast image".

Figure 3:
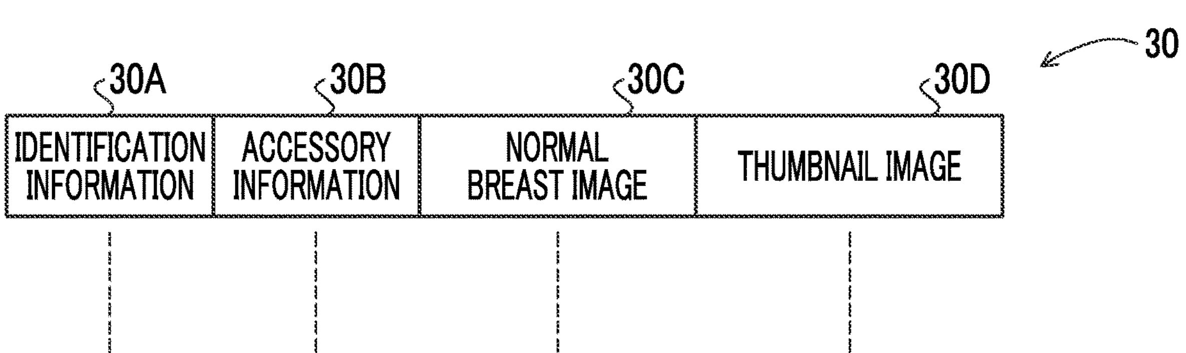
FIG. 3 is a diagram showing an example of a breast image database.

The storage unit 22 comprises a read only memory (ROM) 22A, a random access memory (RAM) 22B, and a storage 22C. Various programs and the like executed by the CPU 20A are stored in the ROM 22A in advance. Various data are transitorily stored in the RAM 22B. The storage 22C stores an image processing program 23 executed by the CPU 20A, a breast image database (DB) 30, and various other types of information. The breast image DB 30 includes a plurality of normal breast images received from the console 12. FIG. 3 shows an example of the breast image DB 30. In the breast image DB 30, a normal breast image 30C received from the console 12 is stored in association with identification information 30A, accessory information 30B, and a thumbnail image 30D. The identification information 30A is information for identifying the normal breast image 30C, and examples thereof include a number unique to the normal breast image 30C. The accessory information 30B is information accessory to the normal breast image 30C, and examples thereof include date and time at which the normal breast image 30C is captured, an imaging direction (cranio-caudal (CC) or medio-lateral oblique (MLO)), information on an examinee, and information on an imaging technician. The thumbnail image 30D is a thumbnail image obtained by reducing the normal breast image 30C. As described above, the identification information 30A and the accessory information 30B are associated with the normal breast image 30C received from the console 12.

In a case in which the normal breast image 30C is received from the console 12, the image processing apparatus 16 according to the present exemplary embodiment generates the thumbnail image 30D from the received normal breast image 30C, and stores the generated thumbnail image 30D in the breast image DB 30 in association with the normal breast image 30C. Unlike in the present exemplary embodiment, the console 12 may generate the thumbnail image 30D from the normal breast image 30C, and transmit the normal breast image 30C and the thumbnail image 30D to the image processing apparatus 16. The storage 22C is a non-volatile storage unit, and examples thereof include a hard disk drive (HDD) and a solid state drive (SSD).

Figure 4:
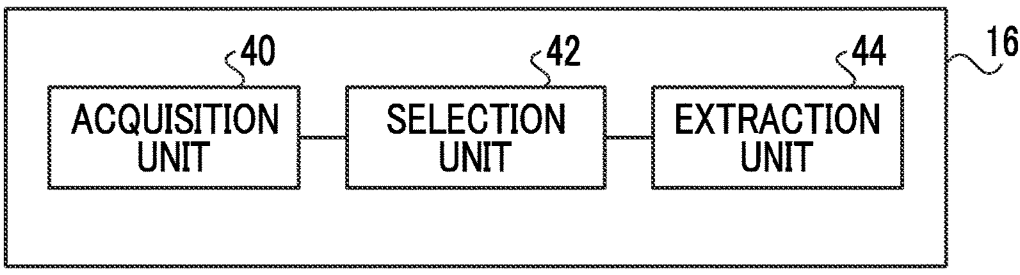
FIG. 4 is a functional block diagram showing an example of functions of the image processing apparatus according to the exemplary embodiment.

Further, FIG. 4 shows a functional block diagram of an example of a configuration of the image processing apparatus 16 according to the present exemplary embodiment. As shown in FIG. 4, the image processing apparatus 16 comprises an acquisition unit 40, a selection unit 42, and an extraction unit 44. For example, in the image processing apparatus 16 according to the present exemplary embodiment, in a case in which the CPU 20A of the control unit 20 executes the image processing program 23 stored in the storage 22C, the CPU 20A functions as the acquisition unit 40, the selection unit 42, and the extraction unit 44.

The acquisition unit 40 has a function of acquiring the normal breast image 30C from the breast image DB 30 stored in the storage 22C. For example, the acquisition unit 40 according to the present exemplary embodiment acquires the normal breast image 30C corresponding to a search condition designated by the user from the plurality of normal breast images 30C stored in the breast image DB 30. The normal breast image 30C acquired by the acquisition unit 40 is output to the selection unit 42.

The selection unit 42 has a function of allowing the user to select the normal breast image 30C. In the present exemplary embodiment, the mammary gland volume type is assigned to the normal breast image 30C based on the mammary gland volume of the breast. The mammary gland volume type is classified according to the mammary gland volume of the breast, more specifically, according to the mammary gland tissue and the fat tissue of the breast, and there are four mammary gland volume types, "extremely high density", "unevenly high density", "scattered mammary glands", and "fatty", in the present exemplary embodiment. The selection unit 42 has a function of allowing the user to select the normal breast image 30C for each of the four mammary gland volume types. In the present exemplary embodiment, there are two types of the mammary gland volume, but the present disclosure is not limited thereto, and two types, three types, or five types or more of the mammary gland volume may be used according to the mammary gland volume.

The selection unit 42 displays the thumbnail image 30D on the display unit 28 for each mammary gland volume type as a selection candidate image for selecting the normal breast image 30C according to the mammary gland volume type assigned to the normal breast image 30C. The user selects the normal breast image 30C to be used for the report for obtaining the certification by the third-party institution from the normal breast images 30C of which the selection candidate image is displayed, for each mammary gland volume type. The selection unit 42 receives the selection of the normal breast image 30C from the user.

The extraction unit 44 has a function of extracting the normal breast image 30C selected for each mammary gland volume type from the plurality of normal breast images 30C stored in the breast image DB 30 based on a plurality of thumbnail images 30D displayed for each mammary gland volume type. In addition, the extraction unit 44 has a function of creating and outputting a report using the extracted normal breast image 30C.

Figure 5A:
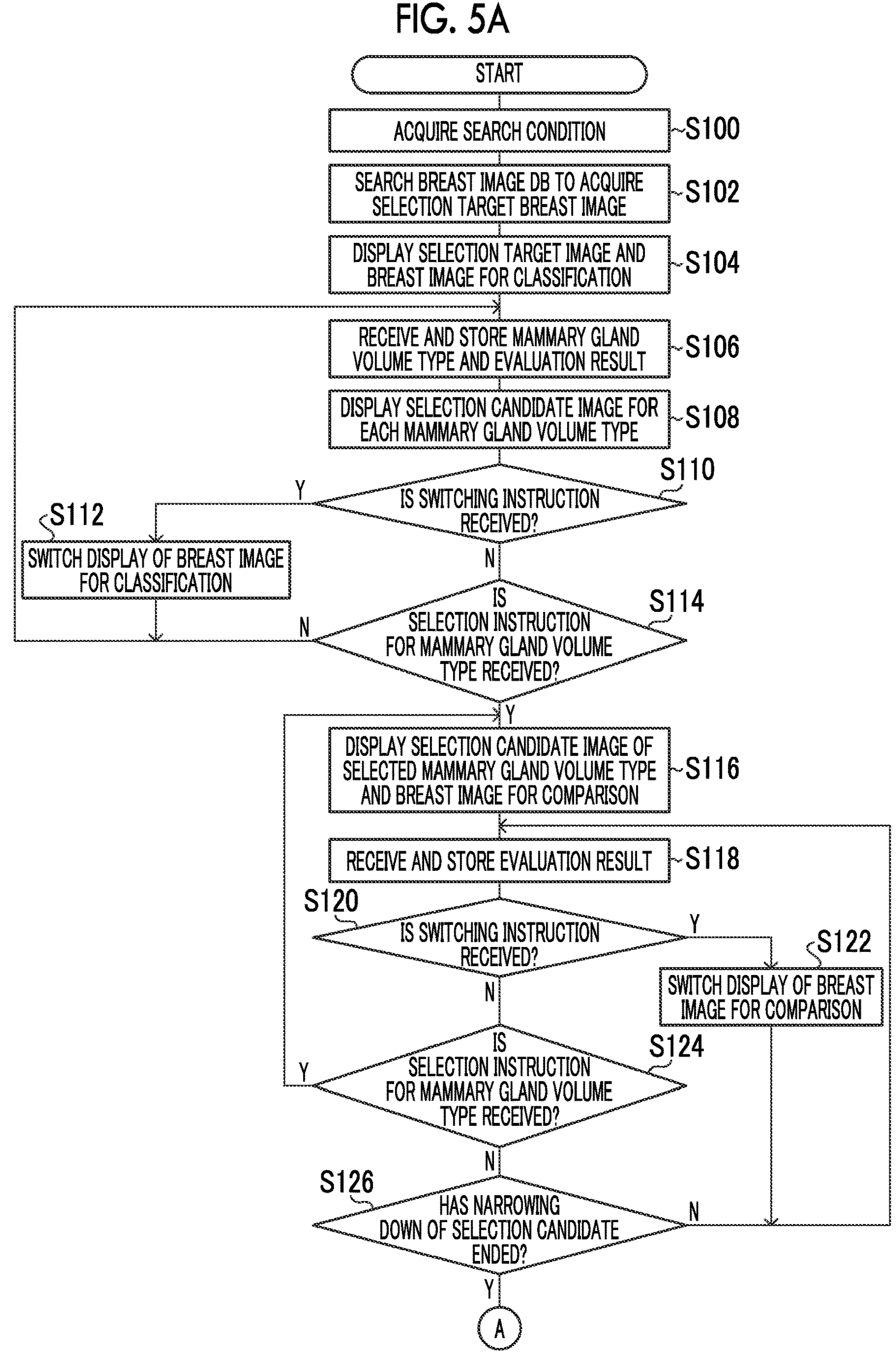
FIG. 5A is a flowchart showing an example of a flow of image processing of the image processing apparatus according to the exemplary embodiment.
Figure 5B:
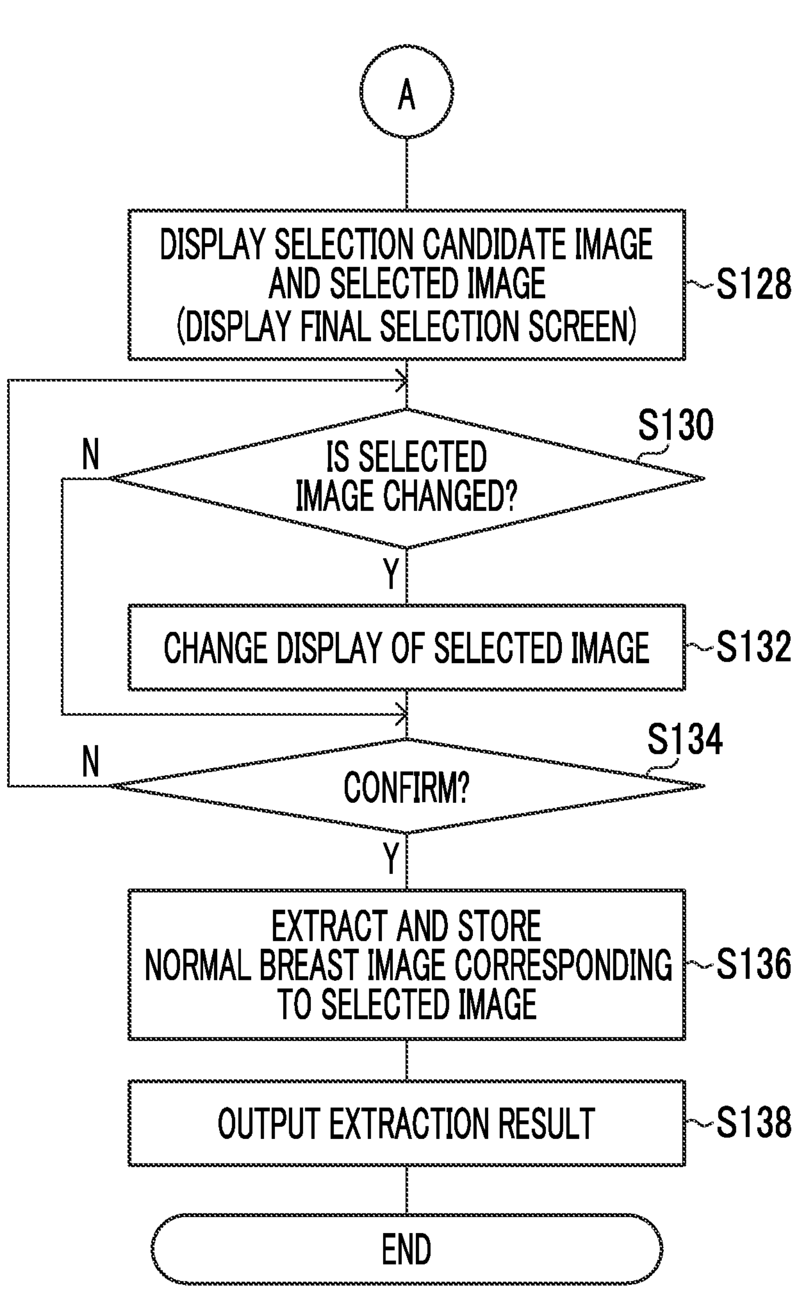
FIG. 5B is a flowchart showing an example of a flow of the image processing of the image processing apparatus according to the exemplary embodiment.

Next, actions of the image processing apparatus 16 according to the present exemplary embodiment will be described with reference to the drawings. FIGS. 5A and 5B are flowcharts showing examples of a flow of image processing executed in the image processing apparatus 16 according to the present exemplary embodiment. For example, in the image processing apparatus 16 according to the present exemplary embodiment, the CPU 20A of the control unit 20 executes the image processing shown in FIGS. 5A and 5B by executing the image processing program 23 stored in the storage 22C based on a start instruction or the like given from the user using the operation unit 26.

Figure 6:
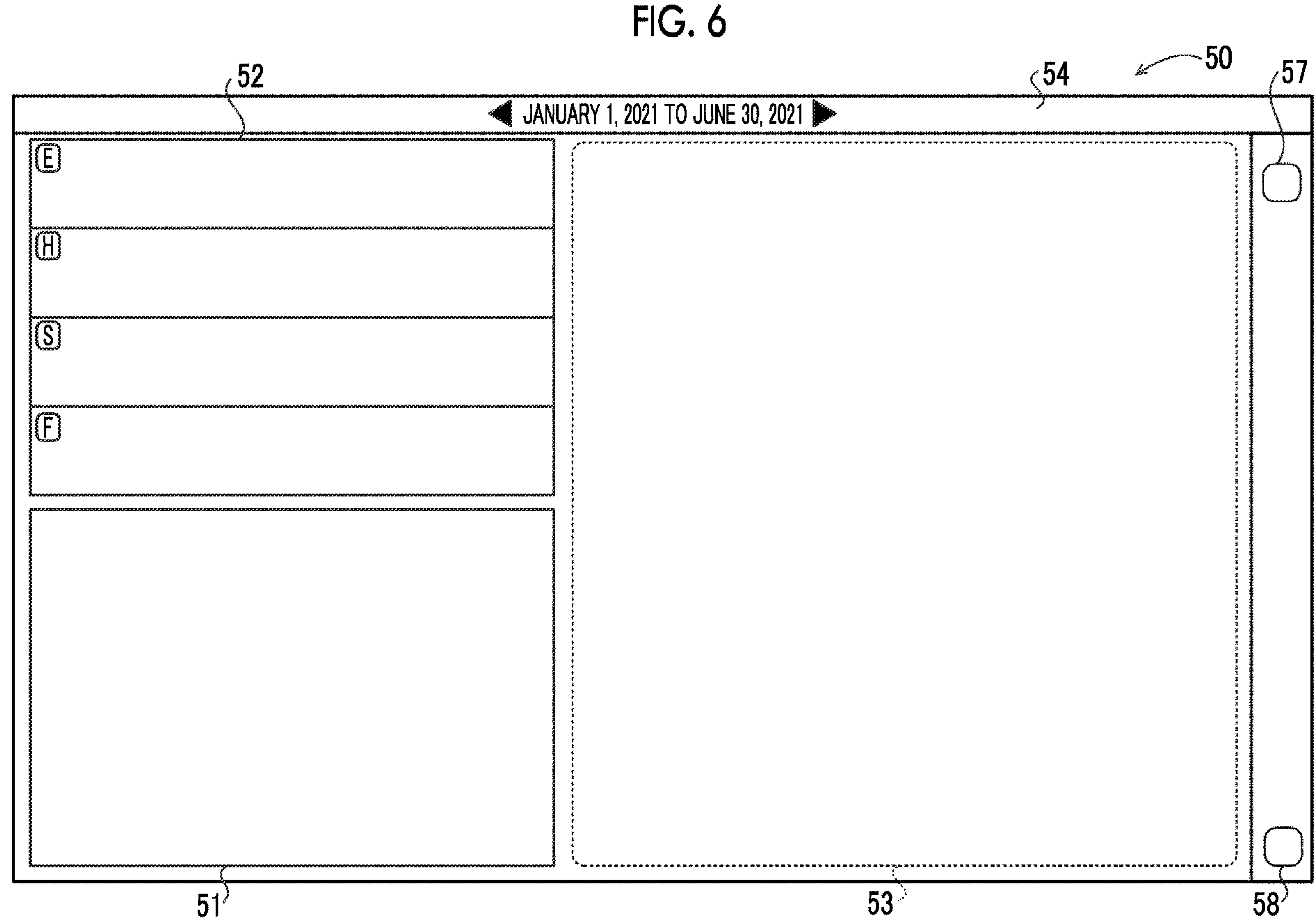
FIG. 6 is a diagram showing an example of an initial screen to be displayed on a display unit.

In a case in which the start instruction is received, the control unit 20 displays an initial screen 50 shown in FIG. 6 as an example on the display unit 28. That is, at the start of the image processing shown in FIGS. 5A and 5B, the initial screen 50 is displayed on the display unit 28. The initial screen 50 includes a first region 51, a second region 52, a third region 53, and a fourth region 54. The first region 51 is a region in which a selection target image representing the normal breast image 30C, which is a selection target of the user, is displayed. The second region 52 is a region in which a selection candidate image representing the normal breast image 30C that is a candidate for the selection of the user for each mammary gland volume type, that is, the breast image DB 30 in the present exemplary embodiment is displayed. The third region 53 is a region in which a breast image for classification (details will be described later) or a breast image for comparison (details will be described later) is displayed. The fourth region 54 is a region for setting the search condition. As shown in FIG. 6, the initial screen 50 includes a search button 57.

First, the user operates the fourth region 54 of the initial screen 50 to set the search condition, and then operates the search button 57. FIG. 6 shows a state in which the imaging date and time at which the breast image is captured by the breast imaging apparatus 10 is set in the fourth region 54 as the search condition. The search condition that can be set is not limited to the imaging date and time. Examples of the search condition include a condition related to the examinee, such as age, a condition related to the imaging direction, and a condition related to the imaging technician. The setting of the search condition is not limited to the setting performed by the user, and a predetermined search condition may be automatically set.

In step S100 of FIG. 5A, the acquisition unit 40 acquires the search condition set as described above.

In next step S102, the acquisition unit 40 searches for the breast image DB 30 stored in the storage 22C based on the search condition acquired in step S100, and acquires the normal breast image 30C corresponding to the search condition as the selection target breast image. The acquisition unit 40 acquires the normal breast image 30C from the breast image DB 30 together with the identification information 30A, the accessory information 30B, and the thumbnail image 30D associated with the normal breast image 30C. In the present exemplary embodiment, in a case other than the search condition in which the examinee is the same, the normal breast image 30C to be acquired includes the breast images of different examinees.

Figure 7:
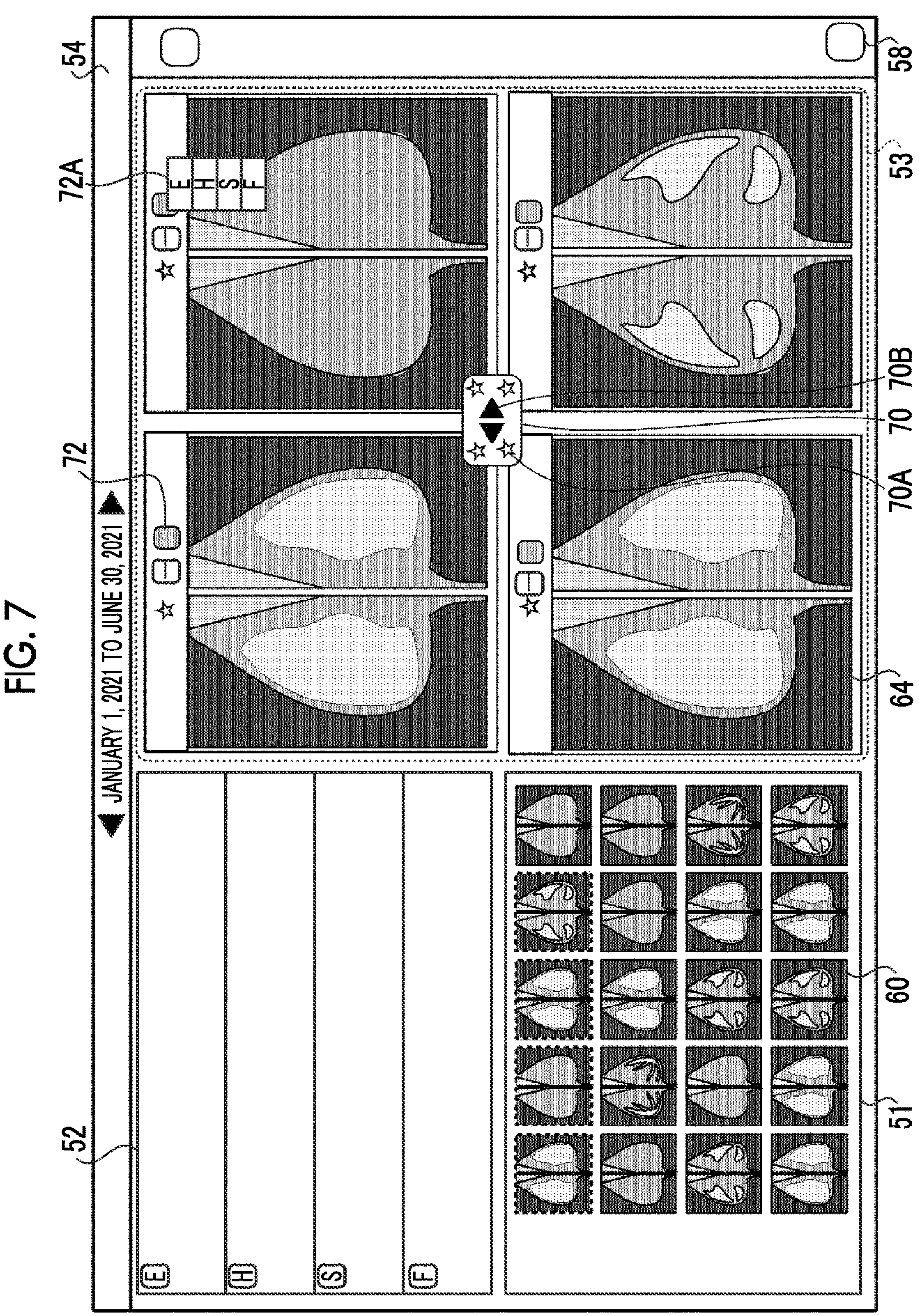
FIG. 7 is a diagram showing an image to be displayed on the display unit.

In next step S104, the selection unit 42 displays the selection target image and the breast image for classification on the display unit 28. As shown in FIG. 7, the selection unit 42 displays the thumbnail images 30D in the first region 51 in any order as selection target images 60 representing the normal breast images 30C acquired in step S102. The selection target image 60 is not limited to the thumbnail image 30D, and may be an image larger than or smaller than the thumbnail image 30D as long as the image represents the normal breast image 30C that is the selection target.

In addition, the selection unit 42 displays a breast image for classification 64 corresponding to the selection target image 60 extracted from the plurality of selection target images 60 displayed in the first region 51, in the third region 53. In the example shown in FIG. 7, the selection unit 42 extracts four selection target images 60 and displays the breast image for classification 64 corresponding to each of the four extracted selection target images 60 in the third region 53. The selection unit 42 displays a mark (in FIG. 7, a dotted line surrounding the selection target image 60) for distinguishing the selection target image 60 corresponding to the breast image for classification 64 displayed in the third region 53 among the plurality of selection target images 60 displayed in the first region 51, from the other selection target images 60. The breast image for classification 64 is a breast image used by the user to classify the mammary gland volume type of the normal breast image 30C. The number and the size of the breast images for classification 64 to be displayed in the third region 53 are not limited, but the breast image for classification 64 is a breast image that is at least larger than the thumbnail image 30D.

Further, the selection unit 42 displays a classification button 72 corresponding to the breast image for classification 64 displayed in the third region 53. The classification button 72 is a button used by the user to input the mammary gland volume type. In a case in which the user operates the classification button 72, the selection unit 42 displays a pull-down menu 72A. In the example shown in FIG. 7, for the mammary gland volume type, "E" in the pull-down menu 72A corresponds to an extremely high density, "H" corresponds to an unevenly high density, "S" corresponds to scattered mammary glands, and "F" corresponds to fatty. The user operates an item in the pull-down menu 72A corresponding to the mammary gland volume type to be classified, based on the breast image for classification 64.

In addition, as shown in FIG. 7, the selection unit 42 displays a button 70 including an evaluation button 70A and a switching button 70B at a position on the third region 53 superimposed on the breast image for classification 64. The evaluation button 70A is a button used by the user to input an evaluation result indicating whether or not to set the breast image for classification 64 as the selection candidate. As described above, in this form, the user selects the normal breast image 30C for obtaining the certification by the third-party institution. Therefore, the breast image for classification 64 is evaluated in consideration of a criterion for obtaining the certification. The evaluation button 70A shown in FIG. 7 is a star-shaped button corresponding to each breast image for classification 64 displayed in the third region 53, and the color of the evaluation button 70A is changed from black to white or from white to black by the operation of the user. In a case in which the breast image for classification 64 is evaluated as the selection target, the user operates the evaluation button 70A and sets the color of the evaluation button 70A to black, thereby inputting the evaluation result. In the present exemplary embodiment, the evaluation button 70A is a star-shaped button, but the present disclosure is not particularly limited thereto, and another shape such as a polygonal or circular shape may be used. In addition, an evaluation stage of the present exemplary embodiment is two stages, with evaluation and without evaluation, but the present disclosure is not particularly limited thereto, and three stages or more may be used. For example, a black star may be used in a case of without evaluation, an outlined star may be used in a case of a first evaluation, and a white star may be used in a case of a second evaluation higher than the first evaluation.

Meanwhile, the switching button 70B is a button that is operated by the user in a case of switching the breast images for classification 64 displayed in the third region 53. By operating the switching button 70B, four selection target images 60 are extracted in the forward direction or the backward direction from the plurality of selection target images 60 displayed in the first region 51 according to a display order. The display of the third region 53 is switched to the breast images for classification 64 corresponding to each of the four extracted selection target images 60.

In next step S106, the selection unit 42 receives and stores the mammary gland volume type and the evaluation result input by the user. As described above, the user selects the mammary gland volume type corresponding to the breast of the breast image for classification 64 from the pull-down menu 72A displayed by operating the classification button 72 corresponding to the breast image for classification 64. The selection unit 42 receives the mammary gland volume type selected by the user through the pull-down menu 72A and assigns the received mammary gland volume type to the normal breast image 30C corresponding to the breast image for classification 64. In addition, the selection unit 42 stores the assigned mammary gland volume type in association with the normal breast image 30C stored in the breast image DB 30.

In addition, as described above, in a case in which the breast image for classification 64 is evaluated as the selection candidate, the user operates the corresponding evaluation button 70A to change the color of the evaluation button 70A from white to black. The selection unit 42 receives the evaluation result input by the evaluation button 70A and assigns the received evaluation result to the normal breast image 30C corresponding to the breast image for classification 64.

Figure 8:
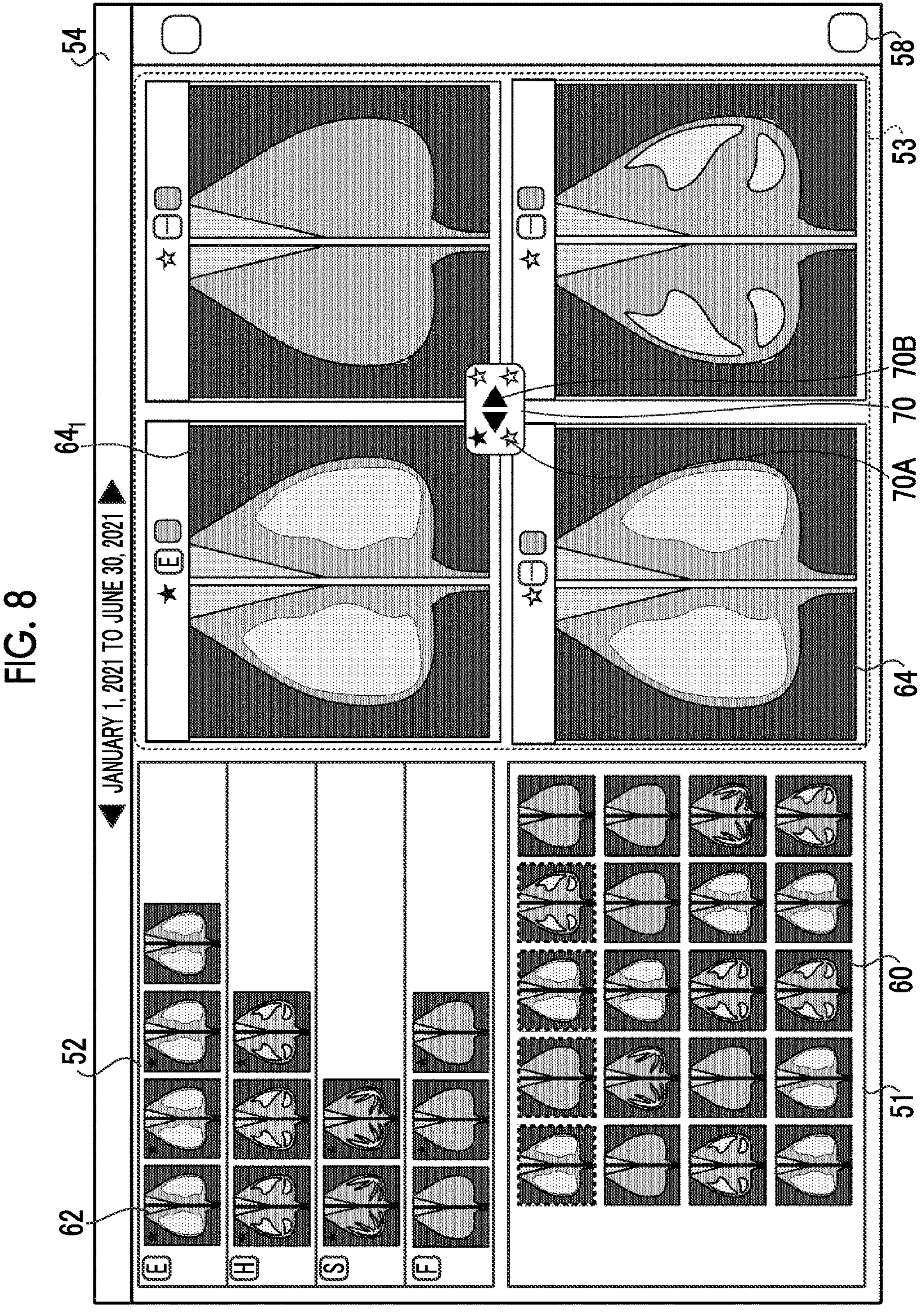
FIG. 8 is a diagram showing an image to be displayed on the display unit.

Further, the selection unit 42 displays, on the display unit 28, information indicating the mammary gland volume type and the evaluation result assigned to the breast image for classification 64 (normal breast image 30C). FIG. 8 shows a state in which the mammary gland volume type of "E: extremely high density" and the evaluation result as the selection candidate received by the selection unit 42 for the breast image for classification $\mathbf{64}_1$ are displayed to correspond to the breast image for classification $\mathbf{64}_1$.

Figure 9:
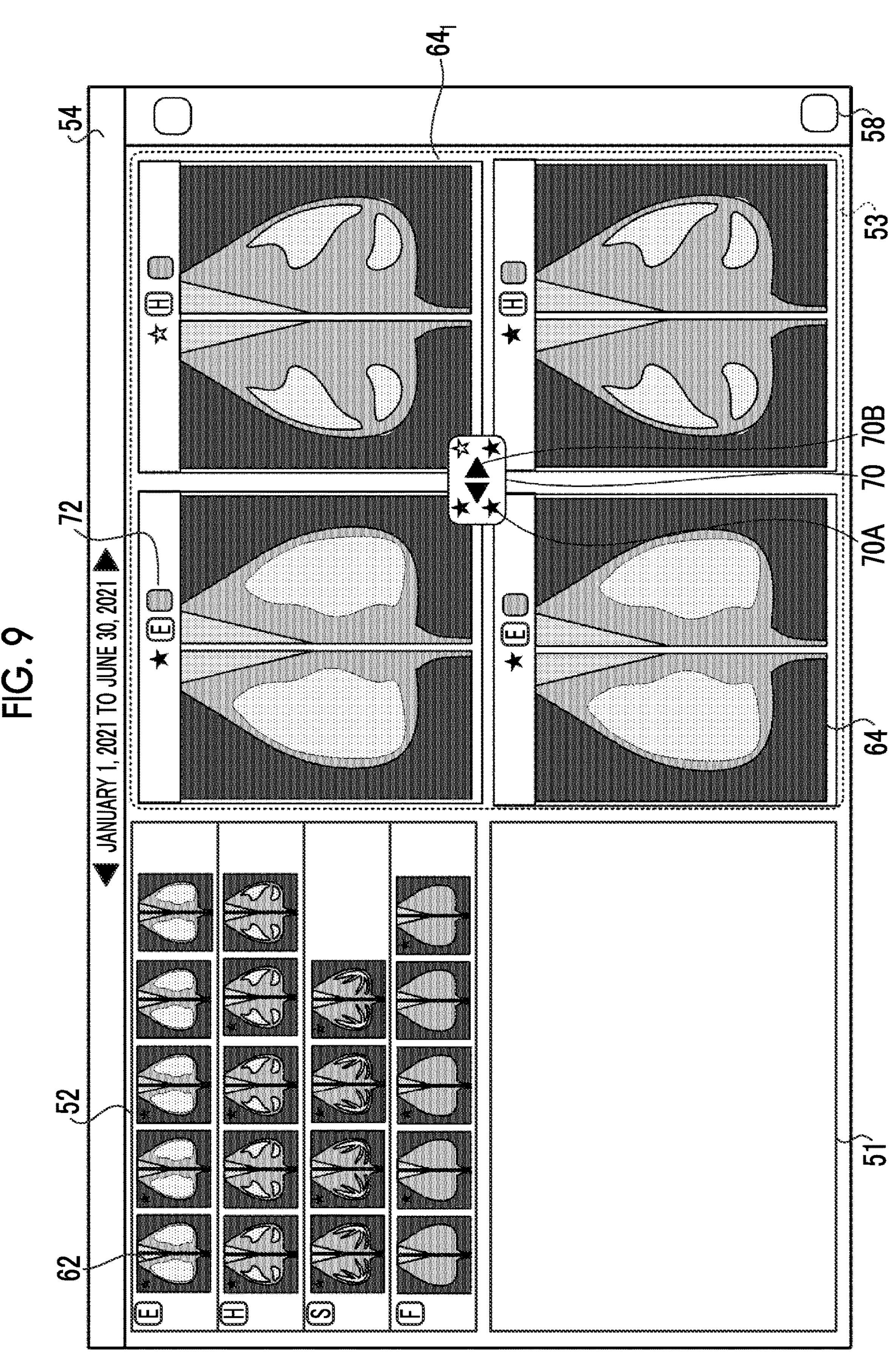
FIG. 9 is a diagram showing an image to be displayed on the display unit.

In next step S108, the selection unit 42 updates the selection target image based on the mammary gland volume type and the evaluation result received in step S106. More specifically, the selection unit 42 displays the selection candidate image 62 in the second region 52 corresponding to the corresponding mammary gland volume type based on the received mammary gland volume type. In the example shown in FIG. 8, the selection candidate images 62 corresponding to the normal breast images 30C classified into each of the four mammary gland volume types are displayed. For example, in the present exemplary embodiment, the thumbnail image 30D of the normal breast image 30C is used as the selection candidate image 62. In the present exemplary embodiment, the selection target image 60 corresponding to the normal breast image 30C to which the mammary gland volume type is assigned is deleted from the first region 51. That is, only the selection target image 60 corresponding to the normal breast image 30C of which the mammary gland volume type is unclassified is displayed in the first region 51. In addition, FIG. 9 shows an example of a display screen in a state in which the classification of the mammary gland volume type has ended for all the normal breast images 30C (breast images for classification 64). In the present exemplary embodiment, although the division of the second region 52 for each mammary gland volume type has been described as an example, the present disclosure is not limited thereto. For example, the display of the second region 52 may be changed based on the mammary gland volume type and the evaluation result. Specifically, as shown in FIG. 8, on a first screen, the second region 52 may be divided for each mammary gland volume type, and only an image in which the evaluation in the selection candidate image 62 is equal to or higher than a specific criterion (for example, white star) may be extracted and displayed. Only in a case in which the second region 52 of a specific mammary gland volume type (for example, E: extremely high density) is selected on the first screen, an image (for example, a black star) in which a specific target mammary gland volume type (for example, E: extremely high density) is assigned and the evaluation result does not satisfy the specific criterion may be displayed on a second screen.

In next step S110, the selection unit 42 determines whether or not a switching instruction is received. As described above, in a case in which the switching button 70B is operated by the user, the selection unit 42 determines that the switching instruction is received. In this case, the determination result in step S110 is Yes and the process proceeds to step S112. In step S112, as described above, after the breast image for classification 64 displayed in the third region 53 is switched, the selection unit 42 returns to step S106 and repeats the processes of steps S106 to S110. On the other hand, in a case in which the switching button 70B is not operated by the user, the selection unit 42 determines that the switching instruction is not received. In this case, in next step S114, the selection unit 42 determines whether or not the selection of the mammary gland volume type is received. The selection unit 42 receives the selection of any one of the second regions 52 for each mammary gland volume type in FIG. 8 or any one of the selection candidate images 62 displayed in the second region 52 for each mammary gland volume type. The selection unit 42 determines that the selection of the mammary gland volume type corresponding to the selected second region 52 or the selection candidate image 62 displayed in the second region 52 is received. In a case in which the selection of the mammary gland volume type is received, the determination result is Yes, and the selection unit 42 proceeds to next step S116. On the other hand, in a case in which the selection of the mammary gland volume type is not received, the determination result in step S114 is No, the process returns to step S106, and the processes in steps S106 to S110 are repeated.

Figure 10:
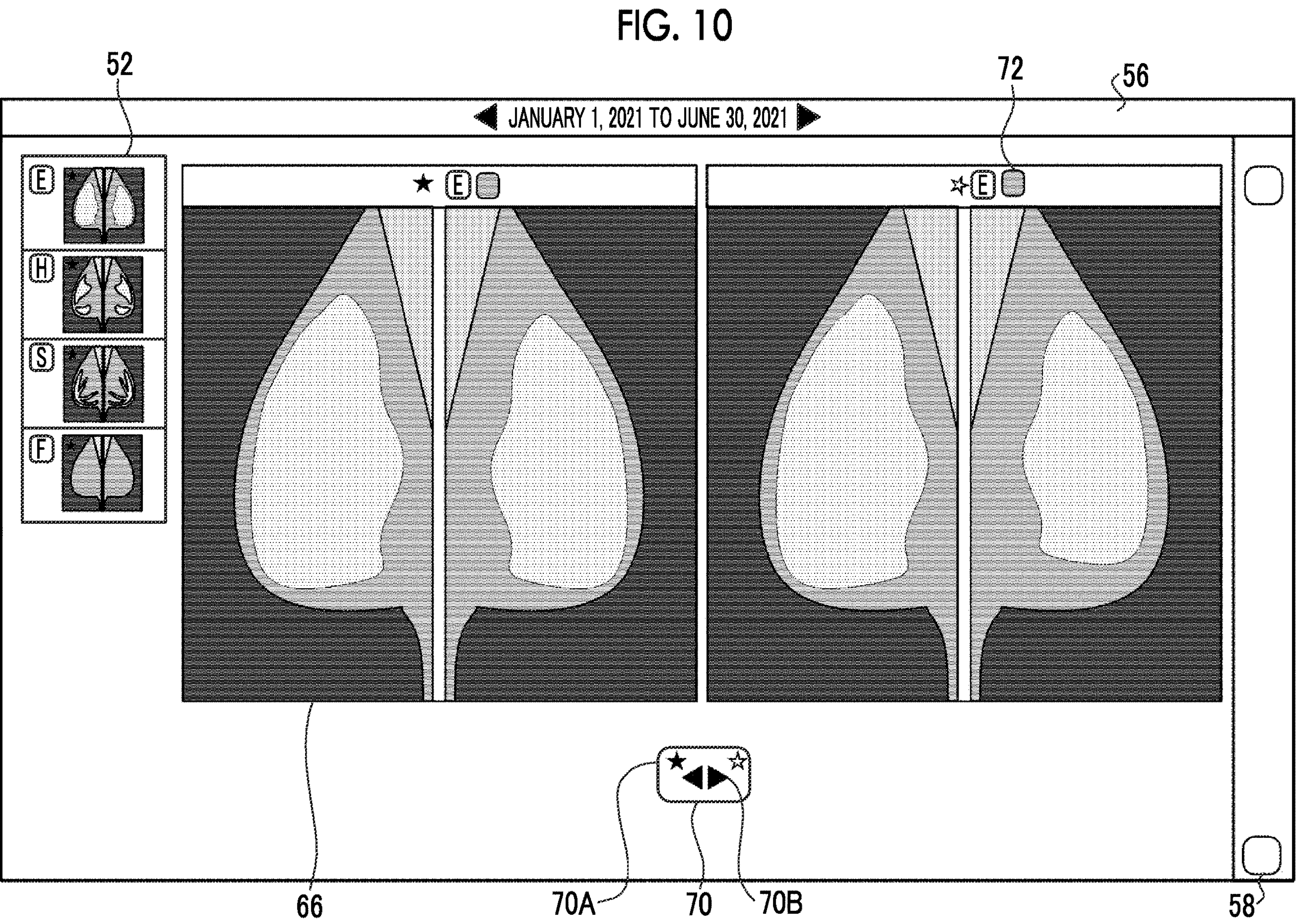
FIG. 10 is a diagram showing an image to be displayed on the display unit.

In step S116, the selection unit 42 displays the selection candidate image 62 corresponding to the selected mammary gland volume type and the breast image for comparison on the same screen. FIG. 10 shows an example in which E is selected as the mammary gland volume type, the selection candidate image 62 of which the mammary gland volume type is E is displayed, and two breast images for comparison 66 of which the mammary gland volume type is E are displayed side by side so that the user can compare the breast images for comparison 66. The breast image for comparison 66 is a breast image for displaying the breast images evaluated as the selection candidates so that the breast images can be compared with each other. Therefore, the breast image for comparison 66 according to the present exemplary embodiment is a breast image that is at least larger than the thumbnail image 30D. Although the example shown in FIG. 10 shows an example in which the two breast images for comparison 66 are displayed, the number of breast images for comparison 66 displayed for comparison is not limited to two, and may be three or more. In addition, the number of breast images for comparison 66 to be displayed on the same screen may be changeable according to the user's instruction. Alternatively, the breast images for comparison 66 of a plurality of mammary gland volume types may be displayed simultaneously, and the selection candidate may be narrowed down for each of the plurality of mammary gland volume types. In this case, the breast image for comparison 66 is displayed in an adjacent manner for each of the same mammary gland volume types. Although the example shown in FIG. 10 shows an example in which the two breast images for comparison 66 are displayed side by side without being superimposed on each other, but a part of the breast images for comparison 66 may be displayed in a superimposed state.

Further, the selection unit 42 according to the present exemplary embodiment displays, side by side, the breast images for comparison 66 having the same predetermined condition among the breast images for comparison 66, with reference to the accessory information 30B. It is preferable that the predetermined condition includes at least one of a technique or the imaging direction. For example, the imaging direction may be compared between the images of which the imaging direction is MLO.

The user compares a plurality (two in FIG. 10) of displayed breast images for comparison 66 and narrows down the selection candidate. In a case in which the breast image for comparison 66 is excluded from the selection candidate, the user operates the evaluation button 70A of the button 70 corresponding to the breast image for comparison 66 and changes the color of the evaluation button 70A from black to white, thereby inputting the evaluation result.

In next step S118, the selection unit 42 receives the evaluation result input by the user using the evaluation button 70A, assigns the evaluation result to the normal breast image 30C corresponding to the breast image for comparison 66, and stores the evaluation result.

In next step S120, the selection unit 42 determines whether or not the switching instruction is received. In a case in which the switching button 70B is operated by the user, the selection unit 42 determines that the switching instruction is received. In this case, the determination result in step S120 is Yes and the process proceeds to step S122. In step S122, the selection unit 42 switches the display of the breast images for comparison 66. After executing step S122, the process returns to step S118, and the processes of step S118 and S120 are repeated.

On the other hand, in a case in which the switching button 70B is not operated by the user, the selection unit 42 determines that the switching instruction is not received. In this case, the determination result in step S120 is No and the process proceeds to step S124. In step S124, it is determined whether or not a selection instruction of the mammary gland volume type is received. As in step S114, the selection unit 42 receives the selection of any one of the second regions 52 for each mammary gland volume type in FIG. 10 or the selection of any one of the selection candidate images 62 displayed in the second region 52 for each mammary gland volume type. The selection unit 42 determines that the selection of the mammary gland volume type corresponding to the selected second region 52 or the selection candidate image 62 displayed in the second region 52 is received. In a case in which the selection of the mammary gland volume type is received, the selection unit 42 proceeds to step S116 of displaying the selection candidate image 62 of the selected mammary gland volume type and the breast image for comparison 66. On the other hand, in a case in which the selection of the mammary gland volume type is not received, the determination result in step S124 is No, and the process proceeds to step S126.

In the present exemplary embodiment, the selection unit 42 can receive the selection of the mammary gland volume type in steps S114 and S116 and receive the evaluation result of the mammary gland volume type in any order, but the present disclosure is not limited thereto. The selection unit 42 may display the selection candidate image 62 and the breast image for comparison 66 in a predetermined order. For example, the breast images for comparison 66 to be displayed on the display unit 28 are switched in the order of the mammary gland volume types, E: extremely high density, H: unevenly high density, S: scattered mammary glands, and F: fatty. For example, in a case in which all the breast images for comparison 66 corresponding to the candidate image (normal breast image 30C) to which E: extremely high density is assigned as the mammary gland volume type are displayed, the selection unit 42 switches the display of the display unit 28 to the breast image for comparison 66 corresponding to the candidate image (normal breast image 30C) to which H: unevenly high density is assigned.

In step S126, the selection unit 42 determines whether or not the narrowing down of the selection candidate has ended. In a case in which it is determined that the narrowing down has ended, the user operates a decision button 58. In the present exemplary embodiment, the number of selection candidates remaining after the narrowing down is not limited. In a case in which the decision button 58 is operated, the selection unit 42 determines that the narrowing down of the selection candidate has ended. In a case in which the narrowing down of the selection candidate has not ended, the determination result in step S126 is No, and the process returns to step S118.

On the other hand, in a case in which the narrowing down of the selection candidate has ended and the decision button 58 is operated by the user, the determination result in step S126 is Yes, and the process proceeds to step S128.

As described above, through the processes of steps S116 to S126, the selection candidate is narrowed down for each mammary gland volume type, and then a process for final selection is performed in consideration of the breast images of different mammary gland volume types.

Figure 11:
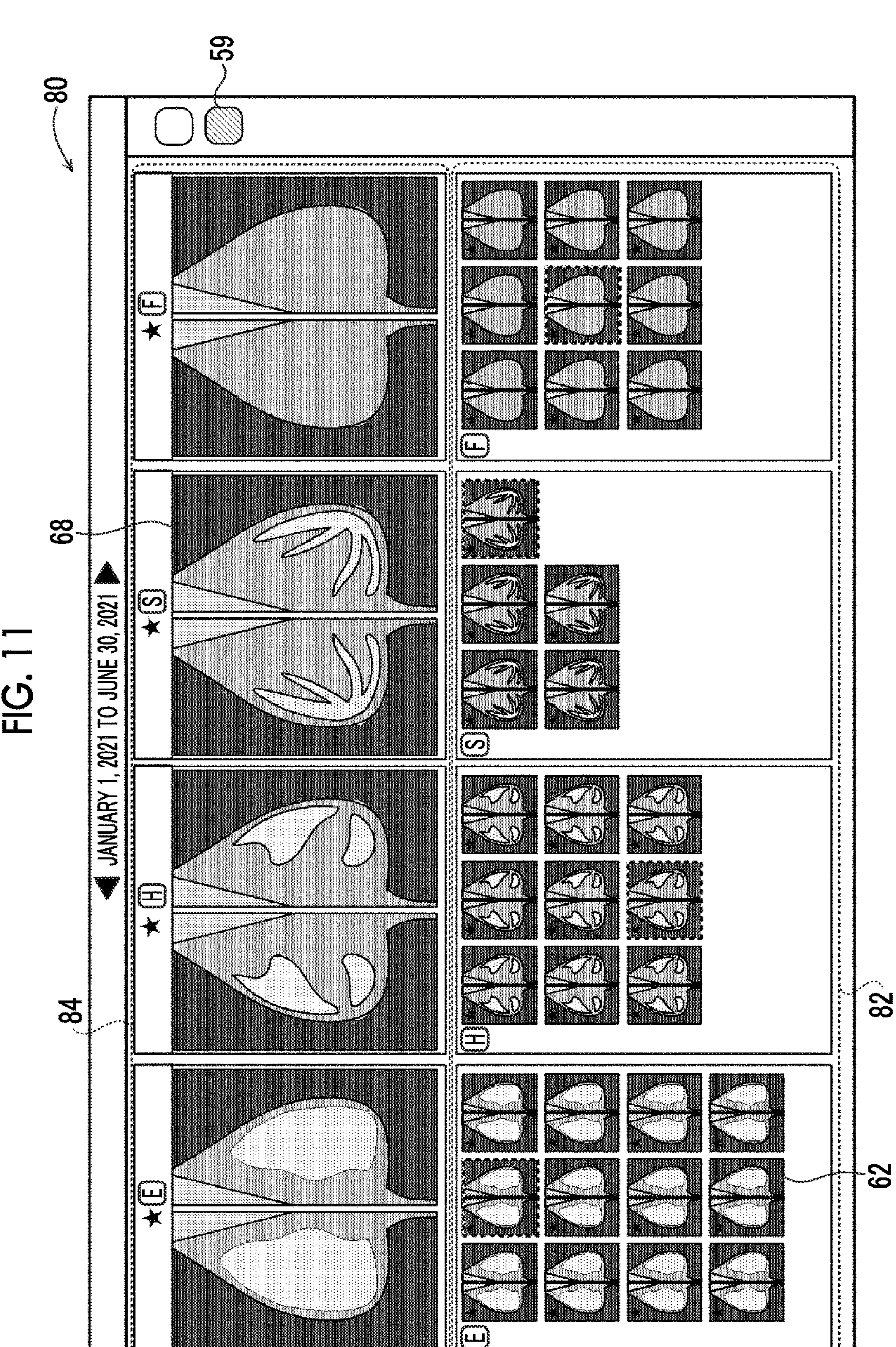
FIG. 11 is a diagram showing an example of a final selection screen to be displayed on the display unit.

In step S128, the selection unit 42 displays a final selection screen 80 including the selection candidate image 62 and a selected image on the display unit 28. FIG. 11 shows an example of the final selection screen 80.

The selection unit 42 displays the selection candidate image 62 for each mammary gland volume type in a fifth region 82 of the final selection screen 80. Further, the selection unit 42 displays the selected image 68 in a sixth region 84 of the final selection screen 80. The selected image 68 is a breast image selected by the user from the selection candidate images 62 displayed in the fifth region 82. The size of the selected image 68 is not particularly limited, but is at least larger than the selection candidate image 62, that is, the thumbnail image 30D. The normal breast image 30C corresponding to the selected image 68 displayed in the sixth region 84 is a breast image finally selected by the user. In an initial state in which the display of the final selection screen 80 is started, the selection unit 42 displays the selected image 68 corresponding to any selection candidate image 62 in the sixth region 84. On the final selection screen 80, the selection candidate image 62 displayed in the fifth region 82 may be limited to an image in which the evaluation satisfies a certain condition. For example, only an image in which the evaluation in the selection candidate image 62 is equal to or higher than the specific criterion (for example, white star) may be extracted and displayed.

The user compares the selected images 68 of each mammary gland volume type selected in the sixth region 84 to select one breast image to be used for the report for obtaining the certification by the third-party institution for each mammary gland volume type. In a case in which the breast image to be selected is changed, in other words, in a case in which the selected image 68 displayed in the sixth region 84 is changed, the user selects a desired selection candidate image 62 from a plurality of selection candidate images 62 displayed in the fifth region 82. In this case, for example, the user clicks the selection candidate image 62 to select the selection candidate image 62. The selection unit 42 displays a mark (in FIG. 11, a dotted line surrounding the selection candidate image 62) for distinguishing the selection candidate image 62 displayed in the sixth region 84 as the selected image 68, that is, selected by the user, from the other selection candidate images 62.

In next step S130, the selection unit 42 determines whether or not to change the selected image 68 displayed in the sixth region 84. As described above, in a case in which the user selects the selection candidate image 62 displayed in the fifth region 82, the selection unit 42 receives the change to the selected selection candidate image 62. In a case in which the change is not received, the determination result in step S130 is No, and the process proceeds to step S134. On the other hand, in a case in which the change is received, the determination result in step S130 is Yes, and the process proceeds to step S132.

In step S132, the selection unit 42 changes the selected image 68 to be displayed in the sixth region 84 to the selected image 68 corresponding to the normal breast image 30C corresponding to the selection candidate image 62 selected by the user.

In next step S134, the selection unit 42 determines whether or not to confirm the selection of the breast image by the user. In a case in which the user confirms the normal breast image 30C corresponding to the selected image 68 displayed in the sixth region 84 as the breast image to be finally selected, the user operates an output button 59 to give an instruction for outputting the selected normal breast image 30C. The determination result in step S132 is No until the output button 59 is operated by the user, the process returns to step S130, and the processes in step S130 and S132 are repeated. However, in a case in which the output button 59 is operated by the user, the determination result in step S134 is Yes, and the process proceeds to step S136.

In step S136, the extraction unit 44 extracts the normal breast image 30C corresponding to the selected image 68 displayed in the sixth region 84. Further, the extraction unit 44 stores the extracted normal breast image 30C as the selected image that is finally selected.

In next step S138, the extraction unit 44 outputs the extraction result. For example, the extraction unit 44 according to the present exemplary embodiment outputs information indicating the normal breast image 30C selected by the user as the extraction result. The information indicating the normal breast image 30C selected by the user is, for example, information for specifying an image such as a patient identification (ID) or an examination number in the report. Further, the extraction unit 44 generates and outputs the report for obtaining the certification by the third-party institution using the normal breast image 30C selected by the user. The extraction unit 44 may acquire data other than the normal breast image 30C, which is required for generating the report, from, for example, the accessory information 30B associated with the normal breast image 30C, or may acquire the data from an external apparatus based on the identification information 30A, the accessory information 30B, or the like associated with the normal breast image 30C. In addition, as the breast image used for the report, the normal breast image 30C may be used, or the breast image corresponding to the normal breast image 30C may be acquired from an external apparatus, such as a picture archiving and communication systems (PACS), and used based on the information indicating the normal breast image 30C selected by the user.

In a case in which the processing of step S138 ends, the image processing according to the present exemplary embodiment shown in FIGS. 5A and 5B ends. The image processing and the like shown in FIGS. 5A and 5B are examples, and various modification examples can be used. For example, the following modification examples and the like may be used.

Modification Example 1

In the above-described form, the form has been described in which the user classifies the mammary gland volume types for each normal breast image 30C, but in the present modification example, a form will be described in which the image processing apparatus 16 classifies the mammary gland volume types.

Figure 12:
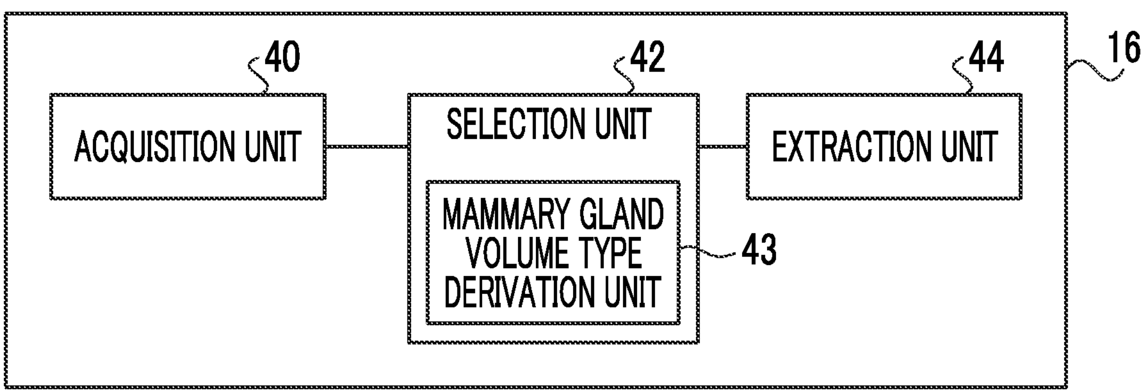
FIG. 12 is a functional block diagram showing an example of functions of an image processing apparatus according to Modification Example 1.

FIG. 12 is a functional block diagram showing an example of a configuration of the image processing apparatus 16 according to the present modification example. As shown in FIG. 12, the selection unit 42 of the image processing apparatus 16 includes a mammary gland volume type derivation unit 43. The mammary gland volume type derivation unit 43 has a function of deriving the mammary gland volume type from the normal breast image 30C acquired by the acquisition unit 40. The method by which the mammary gland volume type derivation unit 43 derives the mammary gland volume type from the normal breast image 30C is not particularly limited. For example, the mammary gland content for each pixel may be derived as the mammary gland volume, and the mammary gland volume type may be derived based on the derived mammary gland content. The method by which the mammary gland volume type derivation unit 43 derives the mammary gland content is not particularly limited, and a known method can be applied. For example, the mammary gland volume type derivation unit 43 can derive the mammary gland content based on a pixel value of a region in which the breast is not shown in the normal breast image 30C, that is, a so-called blank region, a pixel value of a pixel corresponding to the fat, a pixel value of a pixel which is a derivation target of the mammary gland content, and an average attenuation coefficient ratio between the mammary gland and the fat (average attenuation coefficient of mammary gland/average attenuation coefficient of fat). In the present modification example, the image processing apparatus 16 derives the mammary gland volume type, but the present disclosure is not limited thereto. The console 12 may include the mammary gland volume type derivation unit 43, and the console 12 may derive the mammary gland volume type and assign the derived mammary gland volume type to the breast image as the accessory information 30B. The image processing apparatus 16 receives the mammary gland volume type derived by the console 12 as the accessory information 30B, and executes the processes in and after step S116 based on the received mammary gland volume type.

The selection unit 42 assigns the mammary gland volume type derived by the mammary gland volume type derivation unit 43 to the normal breast image 30C.

Figure 13:
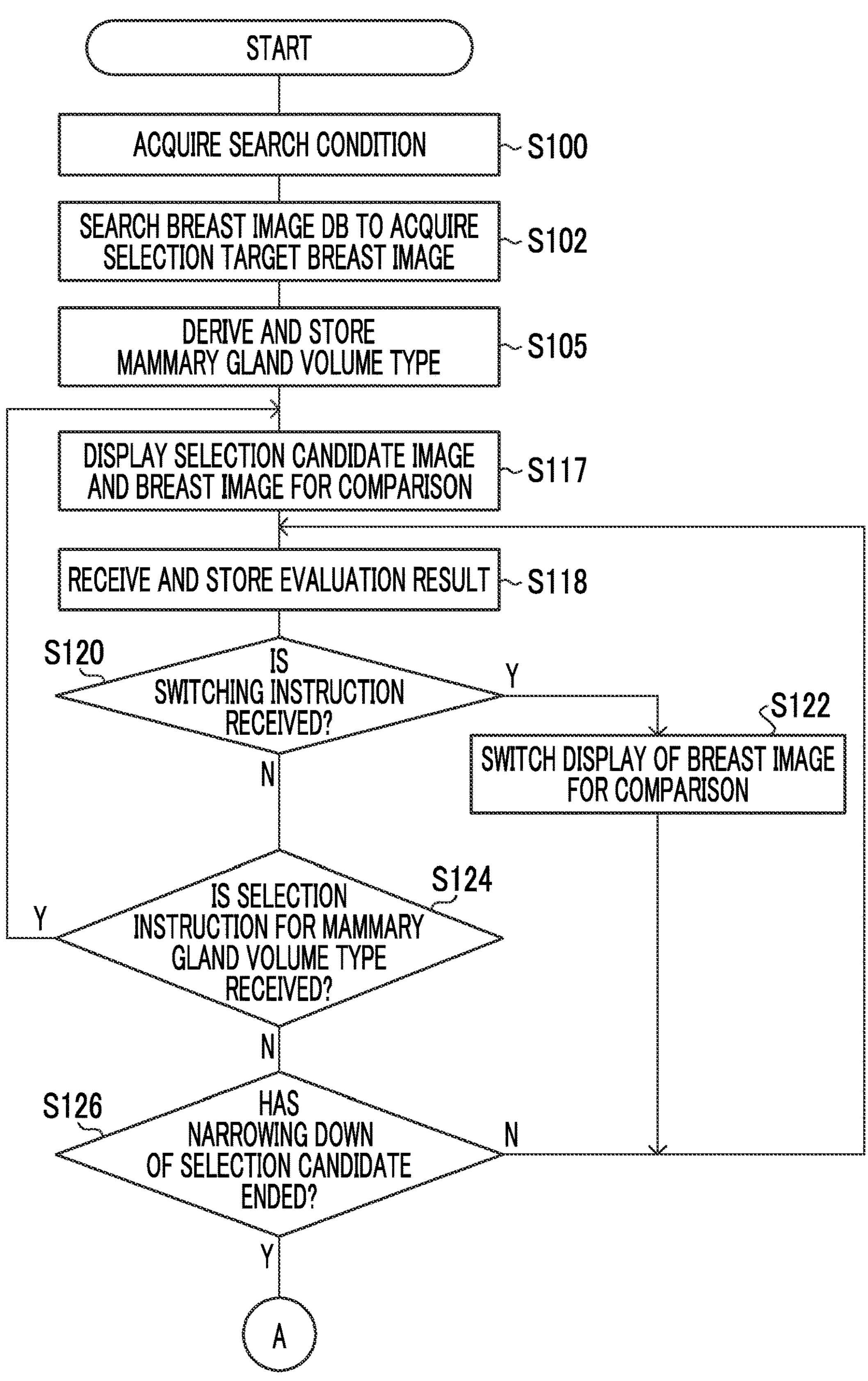
FIG. 13 is a flowchart showing an example of a flow of image processing of the image processing apparatus according to Modification Example 1.

FIG. 13 is a flowchart showing an example of a flow of image processing according to the present modification example. The image processing according to the present modification example is different from the image processing (refer to FIG. 5A and FIG. 5B) according to the above-described form in that the process of step S105 is provided instead of steps S104 to S114, and the process of step S117 is provided instead of step S116.

In step S105 in FIG. 13, the mammary gland volume type derivation unit 43 derives the mammary gland volume type of the normal breast image 30C, which is the selection target and acquired in step S102 as described above, and stores the derived mammary gland volume type in association with the normal breast image 30C. As described above, the selection unit 42 assigns the mammary gland volume type derived by the mammary gland volume type derivation unit 43 to the normal breast image 30C.

In the present modification example, by assigning the mammary gland volume type to the normal breast image 30C via the selection unit 42 in this way, the normal breast images 30C acquired in step S102 are all selection candidates.

Figure 14:
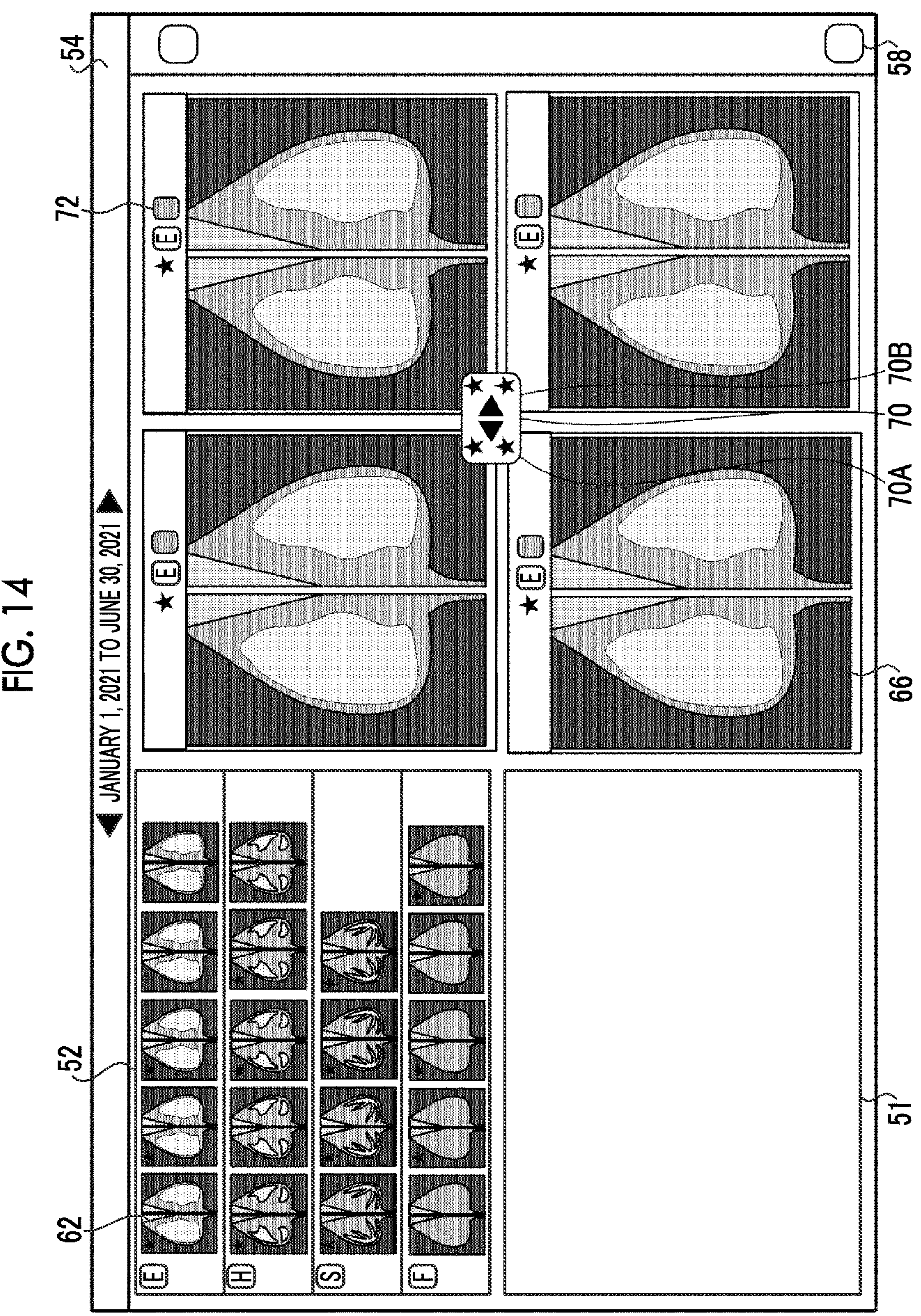
FIG. 14 is a diagram showing an image to be displayed on a display unit in Modification Example 1.

Therefore, in next step S117, the selection unit 42 displays the selection candidate image 62 and the breast image for comparison 66 on the same screen as shown in FIG. 14 as an example. In the example shown in FIG. 14, the selection unit 42 displays the breast images for comparison 66 corresponding to each of the four selection candidate images 62.

As described above, in the present modification example, since the image processing apparatus 16 automatically classifies the mammary gland volume types, it is possible to reduce the labor of the user for classifying the mammary gland volume types.

After the image processing apparatus 16 performs the classification and the assignment of the mammary gland volume types, the user may be able to change the assigned mammary gland volume type. For example, as described above in the form, in a case in which the mammary gland volume type input by the user operating the classification button 72 and the pull-down menu 72A is received, the selection unit 42 changes the mammary gland volume type assigned to the normal breast image 30C to the received mammary gland volume type.

Modification Example 2

In the present modification example, a form will be described in which a selection target breast image is acquired based on the breast image selected in the past by the user.

Figure 15:
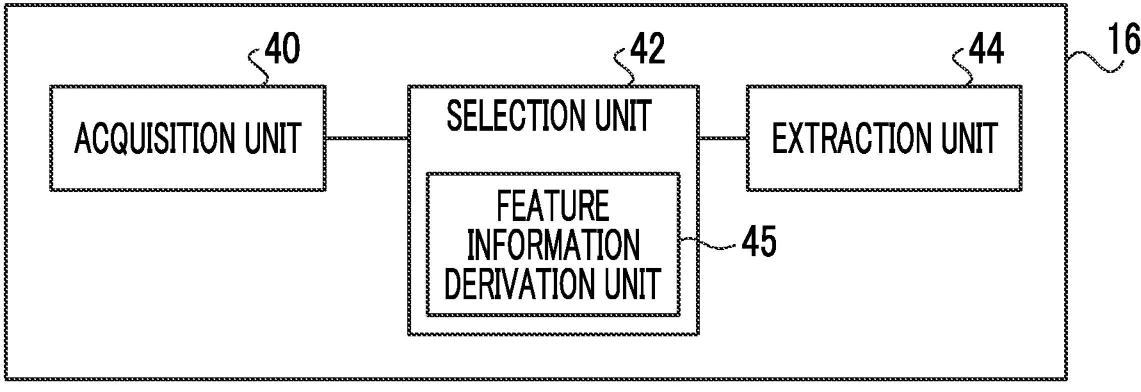
FIG. 15 is a functional block diagram showing an example of functions of an image processing apparatus according to Modification Examples 2 and 3.

FIG. 15 is a functional block diagram showing an example of a configuration of the image processing apparatus 16 according to the present modification example. As shown in FIG. 15, the selection unit 42 of the image processing apparatus 16 includes a feature information derivation unit 45. The feature information derivation unit 45 has a function of deriving feature information indicating a feature of the breast image selected in the past. As described above, the extracted normal breast image 30C is stored as the selected image, which is finally selected, through the process of step S136 of the image processing (see FIGS. 5A and 5B). The feature information derivation unit 45 acquires the normal breast image 30C, which is the stored selected image, and derives the feature information indicating the feature of the normal breast image 30C. The type of the feature information derived by the feature information derivation unit 45 from the normal breast image 30C and the derivation method are not particularly limited. For example, the feature information may be information indicating the mammary gland volume, a distribution of the mammary glands, a position of a skin line of the breast, or the like. In addition, the information indicating the feature based on the criterion for obtaining the certification by the third-party institution may be used.

FIG. 16A is a flowchart showing an example of a flow of image processing according to the present modification example. The image processing according to the present modification example is different from the image processing (see FIG. 5A and FIG. 5B) according to the above-described form in that the processes of steps S103A and S103B are provided between steps S102 and S104.

In step S103A of FIG. 16A, the feature information derivation unit 45 derives the feature information from the normal breast image 30C selected in the past as described above.

In next step S103B, the extraction unit 44 specifies the normal breast image 30C, which is the selection target, from the normal breast image 30C acquired in step S102 based on the feature information derived in step S103A. Specifically, the extraction unit 44 derives the feature information from all the normal breast images 30C acquired in step S102 by the feature information derivation unit 45 in the same manner as in step S103A. In addition, the extraction unit 44 compares the feature information (feature amount) of the normal breast image 30C selected in the past with the feature information (feature amount) of the normal breast image 30C acquired in step S102, and specifies, as the normal breast image 30C that is the selection target, the normal breast image 30C having the same feature information (feature amount) as the feature information (feature amount) of the normal breast image 30C selected in the past.

As described above, according to the present modification example, since the normal breast image 30C having the same feature information (feature amount) is selected as the selection target based on the normal breast image 30C selected in the past, it is possible to narrow down the selection target. Therefore, it is possible to reduce the load on the user's selection.

In step S102 of the image processing, the normal breast image 30C to be acquired from the breast image DB 30 may be specified based on the feature information (feature amount) of the normal breast image 30C selected in the past.

In addition, in a case in which there are the plurality of normal breast images 30C selected in the past, the most recent normal breast image 30C may be used, or a statistical value such as an average value of the feature amounts of pieces of the feature information derived from the plurality of normal breast images 30C may be used.

In addition, in the above description, the embodiment has been described in which the selection target breast image is acquired based on the breast image selected in the past by the user, but the selection target breast image may be acquired based on a certification result by the third-party institution. Specifically, the selection target breast image may be acquired based on the breast image for which a pass certification is obtained. FIG. 16B is a flowchart showing an example of a flow of image processing in this case. The image processing shown in FIG. 16B is different from the image processing (see FIGS. 5A and 5B) according to the above-described form in that the process of step S103AA is provided instead of step S103A. In this case, since the above-described "normal breast image 30C selected in the past" in the present modification example may be read as "normal breast image 30C certified as passed", the detailed description thereof will not be repeated.

In addition, in the modification example described above, both the normal breast image 30C selected in the past and the normal breast image 30C certified by the third-party institution are stored in association with the mammary gland volume type. In a case in which the mammary gland volume type is not associated with the normal breast image 30C having the same feature information (feature amount) as the feature information (feature amount) of the normal breast image 30C selected in the past or the normal breast image 30C certified by the third-party institution, the mammary gland volume type associated with the normal breast image 30C selected in the past or the normal breast image 30C certified by the third-party institution may be associated with the normal breast image 30C having the same feature information (feature amount).

Modification Example 3

In the present modification example, an embodiment will be described in which the evaluation result is assigned to the selection target breast image based on the breast image selected in the past by the user.

The image processing apparatus 16 according to the present modification example has the same configuration as the image processing apparatus 16 shown in FIG. 15.

FIGS. 17A and 17B are flowcharts showing examples of a flow of image processing according to the present modification example. The image processing according to the present modification example is different from the image processing (see FIG. 16A) according to Modification Example 2 in that the process of step S103C is provided instead of step S103B.

In step S103C in FIGS. 17A and 17B, the extraction unit 44 assigns the evaluation result to the normal breast image 30C acquired in step S102 based on the feature information (feature amount) derived in step S103A. Specifically, the extraction unit 44 derives the feature information from all the normal breast images 30C acquired in step S102 by the feature information derivation unit 45 in the same manner as in step S103A. In addition, the extraction unit 44 compares the feature information (feature amount) of the normal breast image 30C selected in the past with the feature information (feature amount) of the normal breast image 30C acquired in step S102, and assigns the evaluation result as the selection candidate to the normal breast image 30C having the same feature information (feature amount) as the feature information (feature amount) of the normal breast image 30C selected in the past.

As described above, according to the present modification example, since the evaluation is performed on the normal breast image 30C having the same feature information (feature amount) based on the normal breast image 30C selected in the past, it is possible to narrow down the selection candidate. Therefore, it is possible to reduce the load on the user's selection.

In this case, through the process in step S104, all the selection target images 60 displayed in the first region 51 are images to which the evaluation results are assigned. The selection target image 60 corresponding to the normal breast image 30C evaluated as not being the selection candidate may not be displayed in the first region 51.

Further, in the present modification example, as in Modification Example 2 described above, the evaluation result may be assigned based on the certification result by the third-party institution. Specifically, the evaluation result may be assigned to the acquired normal breast image 30C based on the breast image for which the pass certification is obtained. FIG. 17B is a flowchart showing an example of a flow of image processing in this case. The image processing shown in FIG. 17B is different from the image processing (see FIGS. 5A and 5B) according to the above-described form in that the process of step S103AA is provided instead of step S103A. Further, the image processing shown in FIG. 17B is different from the image processing (see FIGS. 16A and 16B) according to the above-described form in that the process of step S103C is provided instead of step S103B. In this case, since the above-described "normal breast image 30C selected in the past" in the present modification example may be read as "normal breast image 30C certified as passed", the detailed description thereof will not be repeated.

As described above, in the image processing apparatus 16 according to each of the above-described forms, the acquisition unit 40 acquires the plurality of breast images. The selection unit 42 displays, according to any one mammary gland volume type of the plurality of mammary gland volume types assigned to each of the plurality of acquired breast images based on the mammary gland volume of the breast, the plurality of selection candidate images 62 corresponding to each of the plurality of breast images in the second region 52 for each mammary gland volume type. The extraction unit 44 extracts the breast image selected for each mammary gland volume type from the plurality of breast images based on the plurality of selection candidate images 62 displayed for each mammary gland volume type.

Therefore, with the image processing apparatus 16 according to each of the above-described forms, it is possible to easily select the breast image according to the mammary gland volume type from the plurality of breast images. Therefore, it is possible to reduce the load on the user who selects the breast image for each mammary gland volume type.

In the above description, the form has been described in which the breast images (normal breast images 30C) of a pair of left and right breasts are selected, but the breast images may be selected separately for the left and right breasts. In this case, as in the above-described form, the breast image of the left breast may be selected, the breast image of the right breast may be selected, and the breast image of the pair of left and right breasts may be selected by combining the breast image of the left breast and the breast image of the right breast. In this case, the examinee of the breast image of the left breast and the examinee of the breast image of the right breast may be the same or different.

Figure 18:
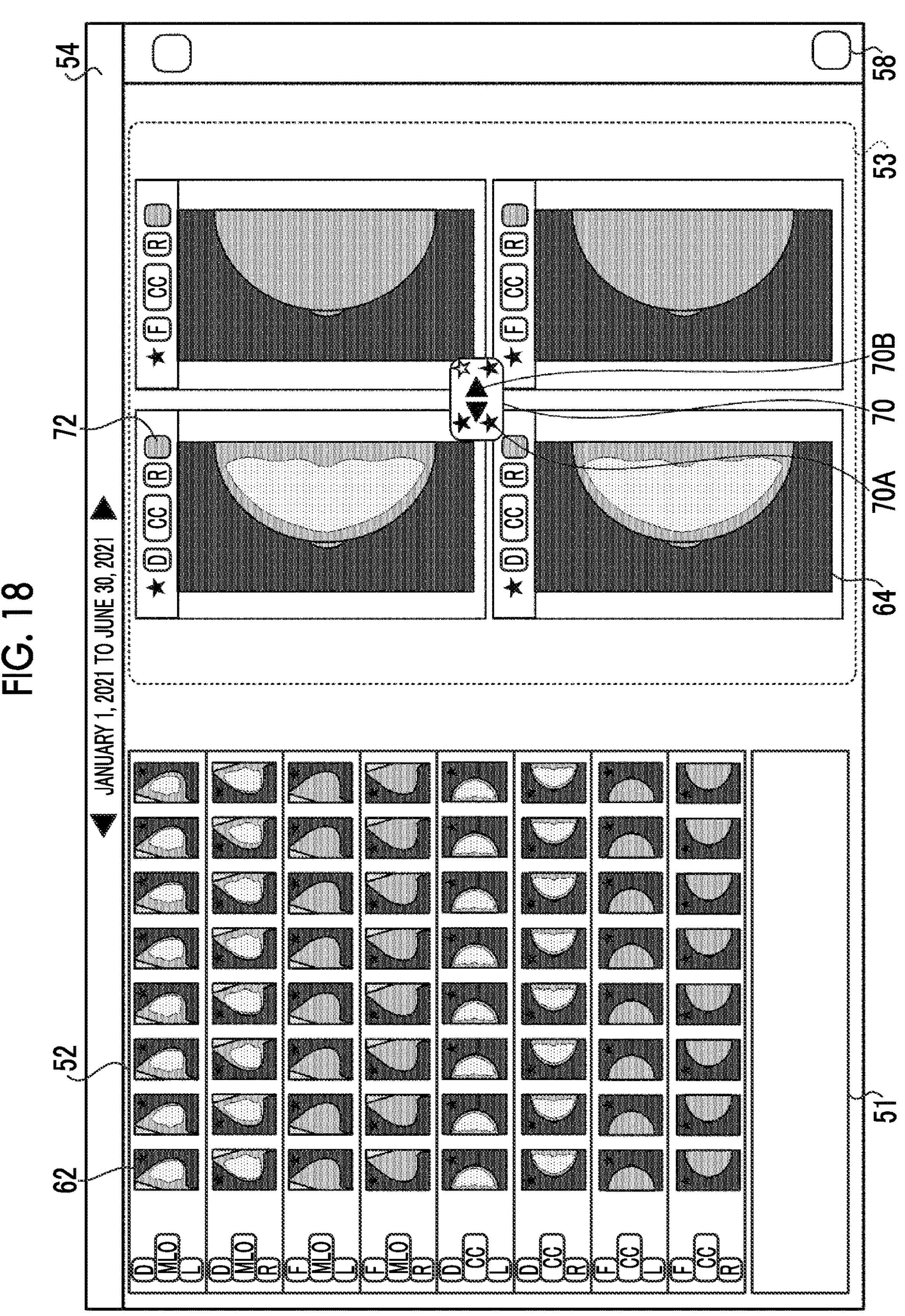
FIG. 18 is a diagram showing a modification example of an image to be displayed on a display unit.

In each of the above-described forms, the breast image may be selected for each mammary gland volume type, but the present disclosure is not limited thereto. The breast image may be selected for each combination of the mammary gland volume type and at least one of the imaging direction, the technique, or the left and right sides. More specifically, a plurality of second regions 52 may be provided for each mammary gland volume type and for each imaging direction. In addition, the plurality of second regions 52 may be provided for each mammary gland volume type and for each of the left breast and the right breast. For example, as shown in FIG. 18, the second region 52 may be divided into the second region 52 including the image of which the mammary gland volume type is D (high density) and the imaging direction is MLO, and the second region 52 including the image of which the mammary gland volume type is D (high density) and the imaging direction is CC. In addition, in this case, the selection instructions for the mammary gland volume type and the imaging direction are received in steps S114 and S124, and the selection candidate image 62 satisfying the selected mammary gland volume type and the imaging direction, along with the breast image for comparison 66, are displayed in step S116. In addition, for example, as shown in FIG. 18, the second region 52 may be divided into the second region 52 including the image of which the mammary gland volume type is F (fatty) and R (right breast) and the second region 52 including the image of which the mammary gland volume type is F (fatty) and L (left breast). In addition, in this case, in steps S114 and S124, the selection instructions of the mammary gland volume type and the right breast or the left breast are received, and in step S116, the selection candidate image 62 satisfying the selected mammary gland volume type and the right breast or the left breast, along with the breast image for comparison 66, are displayed. Similarly, on the final selection screen 80, the breast image may be selected for each combination of the mammary gland volume type and at least one of the imaging direction, the technique, or the left and right sides.

In each of the above-described forms, the case has been described in which the breast images captured by the breast imaging apparatus 10 are stored in the storage unit 22 of the image processing apparatus 16 as the breast image DB 30 via the console 12, but the present disclosure is not limited thereto. The image processing apparatus 16 may acquire the breast images directly from the breast imaging apparatus 10 without using the console 12. Alternatively, the image processing apparatus 16 may acquire the breast images from a breast image DB server as an external apparatus that stores the breast images captured by the breast imaging apparatus 10, via communication.

In each of the above-described forms, the mammography apparatus that irradiates the breast with the radiation R and that captures the radiation image of the breast has been described as the breast imaging apparatus 10, but the present disclosure is not limited thereto. The imaging apparatus may be any apparatus as long as the apparatus can capture an image for checking the mammary gland volume of the breast, and may be, for example, an ultrasound imaging apparatus or a magnetic resonance imaging (MRI) apparatus. Further, in the present exemplary embodiment, the case has been described in which the breast image is the radiation image captured by the mammography apparatus, but the present disclosure is not limited thereto. The image including the breast as the object may be any image as long as the image is an image from which the mammary gland volume of the breast can be checked, and may be, for example, an ultrasound image captured by the ultrasound imaging apparatus with the breast as the subject or an MRI image captured by the MRI apparatus with the breast as the subject.

In addition, in the above description, as shown in FIG. 8 and the like, the form has been described in which the selection candidate image 62 is displayed simultaneously for all the mammary gland volume types, but the number of mammary gland volume types displayed simultaneously is not limited to this form. For example, the mammary gland volume types may be displayed one by one on the display unit 28, or only the selection candidate images 62 corresponding to the mammary gland volume of the displayed breast image for comparison 66 may be displayed together with the breast image for comparison 66.

In addition, in each of the above-described forms, the form has been described in which the user selects the breast image used for the report for obtaining the certification by the third-party institution, but the present disclosure is not limited to this form, and a specific criterion and purpose for the user to select the breast image are not particularly limited.

In addition, in the above-described form, the form has been described in which the image processing apparatus 16 is an example of the image processing apparatus according to the present disclosure, but an apparatus other than the image processing apparatus 16 may have the functions of the image processing apparatus according to the present disclosure. In other words, some or all of the functions of the acquisition unit 40, the selection unit 42, and the extraction unit 44 may be provided in the console 12, an external apparatus, or the like other than the image processing apparatus 16.

In addition, in the above-described form, various processors shown below can be used as the hardware structure of processing units, which execute various types of processing, such as the acquisition unit 40, the selection unit 42, and the extraction unit 44. As described above, in addition to the CPU that is a general-purpose processor that executes software (program) to function as various processing units, the various processors include a programmable logic device (PLD) that is a processor of which a circuit configuration can be changed after manufacture, such as a field programmable gate array (FPGA), and a dedicated electric circuit that is a processor having a circuit configuration that is designed for exclusive use in order to execute specific processing, such as an application specific integrated circuit (ASIC).

One processing unit may be constituted by one of the various processors or may be constituted by a combination of two or more processors of the same type or different types (for example, a combination of a plurality of FPGAs or a combination of a CPU and an FPGA). Moreover, a plurality of processing units may be constituted by one processor.

A first example of the configuration in which the plurality of processing units are constituted by one processor is a form in which one processor is constituted by a combination of one or more CPUs and the software and this processor functions as the plurality of processing units, as represented by computers such as a client and a server. A second example is a form of using a processor that realizes the function of the entire system including the plurality of processing units via one integrated circuit (IC) chip, as represented by a system on chip (SoC) or the like. In this way, as the hardware structure, the various processing units are constituted by one or more of the various processors described above.

Further, the hardware structure of these various processors is, more specifically, an electric circuit (circuitry) in which circuit elements such as semiconductor elements are combined.

In addition, in each of the above exemplary embodiments, the aspect has been described in which the image processing program 23 is stored (installed) in the storage 22C of the storage unit 22 in advance, but the present disclosure is not limited thereto. The image processing program 23 may be provided in a form recorded in a recording medium such as a compact disc read-only memory (CD-ROM), a digital versatile disc read-only memory (DVD-ROM), and a universal serial bus (USB) memory. Moreover, each image processing program 23 may be downloaded from an external apparatus via a network. That is, the program (program product) described in the present exemplary embodiment may be distributed from an external computer, in addition to being provided by using the recording medium.

The entire disclosure of Japanese Patent Application No. 2021-165040 filed on Oct. 6, 2021 is incorporated into the present specification by reference.

All documents, patent applications, and technical standards described in the present specification are incorporated in the present specification by reference to the same extent as in a case in which each of the documents, patent applications, and technical standards are specifically and individually described to be incorporated by reference.

What is claimed is:

1. An image processing apparatus comprising:

at least one processor, wherein the processor:

acquires a plurality of breast images;

displays, according to any one mammary gland volume type among a plurality of mammary gland volume types assigned to each of the plurality of acquired breast images based on a mammary gland volume of a breast, a plurality of selection candidate images corresponding to each of the plurality of breast images for each mammary gland volume type;

extracts one or more breast images from a breast image group to which the same mammary gland volume type is assigned, and displays, side by side, breast images for comparison corresponding to each of the one or more breast images;

displays an evaluation button corresponding to the reception of an evaluation result from a user and a switching button corresponding to the reception of a switching instruction from the user in an adjacent manner or a superimposed manner in a display region of the breast image for comparison;

receives the evaluation result from the user for the breast image for comparison using the evaluation button;

displays the evaluation result;

stores the evaluation result in association with the breast image corresponding to the breast image for comparison to which the evaluation result is assigned;

receives the switching instruction from the user using the switching button for switching the breast images for comparison in a predetermined order for each predetermined number of the breast images for comparison;

switches the breast images for comparison to be displayed, according to the switching instruction; and extracts a breast image selected for each mammary gland volume type from the plurality of breast images based on the plurality of selection candidate images displayed for each of the mammary gland volume types.

2. The image processing apparatus according to claim 1, wherein the selection candidate image is a thumbnail image of a corresponding breast image.

3. The image processing apparatus according to claim 1, wherein the processor:

acquires a certification result for the breast image extracted for each mammary gland volume type, and performs an evaluation regarding the selection on the breast image for comparison based on the breast image associated with the certification result.

4. The image processing apparatus according to claim 1, wherein the processor:

receives selection of the selection candidate image for each mammary gland volume type, extracts the breast image according to the received selection, and performs an evaluation regarding the selection on the breast image for comparison based on feature information indicating a feature of the breast image extracted in the past.

5. The image processing apparatus according to claim 1, wherein the breast image for comparison is an image larger than the selection candidate image.

6. The image processing apparatus according to claim 1, wherein the processor displays the selection candidate image and the breast image for comparison on the same screen.

7. The image processing apparatus according to claim 1, wherein the processor displays, side by side, the breast images for comparison in which at least one of a technique or an imaging direction is the same among the breast images for comparison corresponding to each of the one or more breast images.

8. The image processing apparatus according to claim 1, wherein the processor:

acquires a certification result for the breast image extracted for each mammary gland volume type, and specifies and presents a selection target breast image based on the breast image associated with the certification result.

9. The image processing apparatus according to claim 1, wherein the processor:

receives selection of the selection candidate image for each mammary gland volume type, extracts the breast image according to the received selection, and specifies and presents a selection target breast image based on feature information indicating a feature of the breast image extracted in the past.

10. The image processing apparatus according to claim 1, wherein the plurality of breast images include breast images of different examinees.

11. The image processing apparatus according to claim 1, wherein the plurality of selection candidate images corresponding to each of the plurality of mammary gland volume types are displayed on the same screen.

12. An image processing method executed by a computer, the method comprising:

acquiring a plurality of breast images;

displaying, according to any one mammary gland volume type among a plurality of mammary gland volume types assigned to each of the plurality of acquired breast images based on a mammary gland volume of a breast, a plurality of selection candidate images corresponding to each of the plurality of breast images for each mammary gland volume type;

extracting one or more breast images from a breast image group to which the same mammary gland volume type is assigned, and displays, side by side, breast images for comparison corresponding to each of the one or more breast images;

displaying an evaluation button corresponding to the reception of an evaluation result from a user and a switching button corresponding to the reception of a switching instruction from the user in an adjacent manner or a superimposed manner in a display region of the breast image for comparison;

receiving the evaluation result from the user for the breast image for comparison using the evaluation button;

displaying the evaluation result;

storing the evaluation result in association with the breast image corresponding to the breast image for comparison to which the evaluation result is assigned;

receiving the switching instruction from the user using the switching button for switching the breast images for comparison in a predetermined order for each predetermined number of the breast images for comparison;

switching the breast images for comparison to be displayed, according to the switching instruction; and extracting a breast image selected for each mammary gland volume type from the plurality of breast images based on the plurality of selection candidate images displayed for each of the mammary gland volume types.

13. A non-transitory computer readable medium storing an image processing program causing a computer to execute a process, comprising:

acquiring a plurality of breast images;

displaying, according to any one mammary gland volume type among a plurality of mammary gland volume types assigned to each of the plurality of acquired breast images based on a mammary gland volume of a breast, a plurality of selection candidate images corresponding to each of the plurality of breast images for each mammary gland volume type;

extracting one or more breast images from a breast image group to which the same mammary gland volume type is assigned, and displays, side by side, breast images for comparison corresponding to each of the one or more breast images;

displaying an evaluation button corresponding to the reception of an evaluation result from a user and a switching button corresponding to the reception of a switching instruction from the user in an adjacent manner or a superimposed manner in a display region of the breast image for comparison;

receiving the evaluation result from the user for the breast image for comparison using the evaluation button;

displaying the evaluation result;

storing the evaluation result in association with the breast image corresponding to the breast image for comparison to which the evaluation result is assigned;

receiving the switching instruction from the user using the switching button for switching the breast images for comparison in a predetermined order for each predetermined number of the breast images for comparison;

switching the breast images for comparison to be displayed, according to the switching instruction; and extracting a breast image selected for each mammary gland volume type from the plurality of breast images based on the plurality of selection candidate images displayed for each of the mammary gland volume types.

* * * * *